United States Patent
Koito et al.

(10) Patent No.: US 9,019,324 B2
(45) Date of Patent: Apr. 28, 2015

(54) DISPLAY APPARATUS AND ELECTRONIC DEVICE

(75) Inventors: Takeo Koito, Kanagawa (JP); Daisuke Takama, Kanagawa (JP)

(73) Assignee: Japan Display Inc., Tokyo (JP)

( * ) Notice: Subject to any disclaimer, the term of this patent is extended or adjusted under 35 U.S.C. 154(b) by 60 days.

(21) Appl. No.: 13/604,165

(22) Filed: Sep. 5, 2012

(65) Prior Publication Data

US 2013/0088526 A1    Apr. 11, 2013

(30) Foreign Application Priority Data

Oct. 6, 2011    (JP) .................................. 2011-221979

(51) Int. Cl.
| | |
|---|---|
| G09G 3/36 | (2006.01) |
| H04N 13/04 | (2006.01) |
| G09G 3/00 | (2006.01) |
| G02B 27/22 | (2006.01) |

(52) U.S. Cl.
CPC ........ H04N 13/0413 (2013.01); *G02B 27/2214* (2013.01); *G09G 3/003* (2013.01); *G09G 3/3648* (2013.01); *G09G 2320/0209* (2013.01); H04N 13/0445 (2013.01); H04N 13/0452 (2013.01); H04N 13/0497 (2013.01)

(58) Field of Classification Search
CPC .............. G06G 3/003; H04N 13/0445; H04N 13/0452; H04N 13/0497; H04N 13/0413; G09G 3/3648; G09G 2320/0209; G02B 27/2214
USPC ............ 345/690, 50–54, 58, 87–104; 348/42, 348/51–59, E15.001, E13.001, E13.003, 348/E13.004
See application file for complete search history.

(56) References Cited

U.S. PATENT DOCUMENTS

| | | | | |
|---|---|---|---|---|
| 6,046,711 | A * | 4/2000 | Kouchi | 345/8 |
| 6,532,008 | B1 * | 3/2003 | Guralnick | 345/419 |
| 2005/0062708 | A1 * | 3/2005 | Yoshihara et al. | 345/96 |
| 2009/0102839 | A1 * | 4/2009 | Kim et al. | 345/419 |
| 2009/0109154 | A1 * | 4/2009 | Hong et al. | 345/87 |
| 2011/0141130 | A1 * | 6/2011 | Yagiura | 345/589 |

(Continued)

FOREIGN PATENT DOCUMENTS

| | | |
|---|---|---|
| JP | 03-119889 | 5/1991 |
| JP | 08-001922 | 1/1996 |

(Continued)

OTHER PUBLICATIONS

Japanese Office Action mailed May 13, 2014 for corresponding Japanese Application No. 2011-221979.

*Primary Examiner* — Allison Johnson
*Assistant Examiner* — Vinh Lam
(74) *Attorney, Agent, or Firm* — Rader, Fishman & Grauer PLLC

(57) ABSTRACT

Disclosed herein is a display apparatus including: a display section; and a light-beam control section configured to control a light beam coming from the display section or a light beam propagating to the display section; the display apparatus having a first display mode for displaying a plurality of observing-point images on the display section wherein the observing-point images include two or more first observing-point images, and one or a plurality of second observing-point images, and the number of pixels included in each of the second observing-point images is smaller than the number of pixels included in each of the first observing-point images.

16 Claims, 26 Drawing Sheets

(56) References Cited

U.S. PATENT DOCUMENTS

| | | | |
|---|---|---|---|
| 2011/0157257 A1* | 6/2011 | Bennett et al. | 345/690 |
| 2012/0050148 A1* | 3/2012 | Huang et al. | 345/102 |
| 2012/0320016 A1* | 12/2012 | Hirata | 345/208 |
| 2013/0083081 A1* | 4/2013 | Silverstein | 345/690 |

FOREIGN PATENT DOCUMENTS

| | | |
|---|---|---|
| JP | 10-174127 | 6/1998 |
| JP | 11-095168 | 4/1999 |
| JP | 11-212024 | 8/1999 |
| JP | 2007-316460 | 12/2007 |

* cited by examiner

FL, FIL

FIL, FIR

FIR, FR

FL

FR

FEL

FER

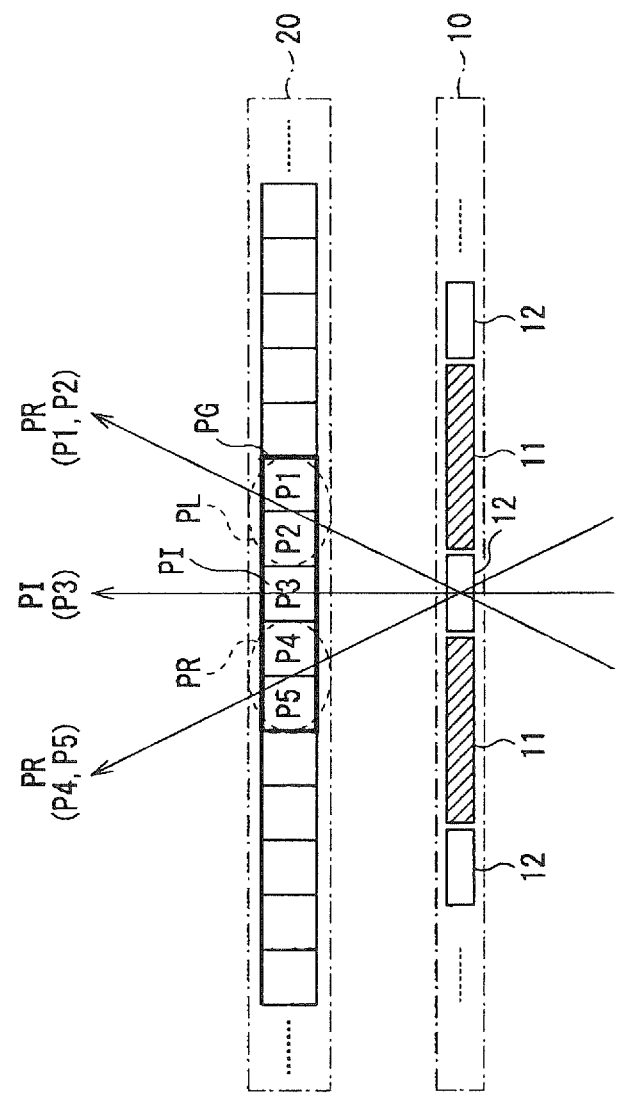

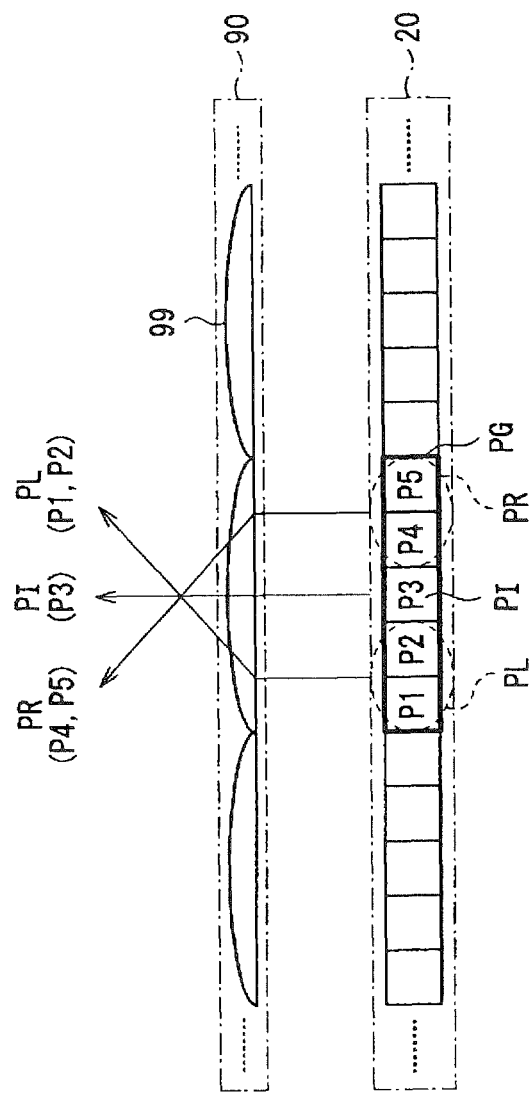

DISPLAY APPARATUS AND ELECTRONIC DEVICE

BACKGROUND

The present disclosure relates to a display apparatus for displaying video pictures and an electronic device each employing such a display apparatus.

In recent years, a display apparatus capable of showing a three-dimensional display has been drawing attention. The three-dimensional display is a display showing observing-point video pictures having disparities for different observing points. That is to say, the three-dimensional display is a display showing observing-point video pictures looking differently when seen from different observing points. To be more specific, the three-dimensional display is a display showing two different observing-point video pictures to respectively the left and right eyes of the observer so that the observer is capable of recognizing the display as a three-dimensional video picture having a depth. In addition, there is being developed a display apparatus capable of presenting a more natural three-dimensional video picture to the observer by displaying three or more observing-point video pictures having disparities for different observing points.

Methods adopted by such a display apparatus typically include a parallax-barrier (or disparity-barrier) method and a lenticular-lens method. In accordance with these methods, a plurality of observing-point video pictures are displayed to the observer at the same time in such a way that, when the observing-point video pictures are observed by the left and right eyes of the observer at different observation angles, the observing-point video pictures look differently to the eyes. For example, Japanese Patent Laid-Open No. Hei 3-119889 discloses a display apparatus adopting the parallax barrier method making use of a liquid-crystal device as a barrier.

It is desirable to provide a display apparatus capable of showing a three-dimensional display to serve as a display apparatus having a reduced amount of the so-called crosstalk which is intermingling of a left-eye image and a right-eye image. In order to reduce the amount of such crosstalk, it is necessary to provide the display apparatus with one selected from a variety of techniques. For example, as described in Japanese Patent Laid-Open No. 2007-316460, in order to reduce the amount of crosstalk, the display apparatus is provided with a method for correcting signal levels of pixel signals because the crosstalk is generated by mutual effects of pixel electric potentials appearing at adjacent pixels separated away from each other in the horizontal direction on a display panel.

SUMMARY

Such crosstalk can also be generated by another cause described as follows. In the display apparatus adopting the parallax-barrier method, the lenticular-lens method or another method, if the observation angles of the left and right eyes of the observer are proper, the observer is capable of observing the displayed images by separating the left-eye image and the right-eye image from each other. For example, if the displayed images are observed at an observation angle between the observation angles of the left and right eyes of the observer, however, the left-eye image and the right-eye image undesirably intermingle with each other. It is therefore feared that such crosstalk causes the observer to feel that the quality of the image deteriorates.

It is thus desirable to present a display apparatus capable of reducing image-quality deterioration caused by crosstalk and an electronic device employing the display apparatus.

A display apparatus according to an embodiment of the present disclosure includes a display section and a light-beam control section. The light-beam control section controls a light beam coming from the display section or a light beam propagating to the display section. The display apparatus has a first display mode for displaying a plurality of observing-point images on the display section. The observing-point images include two or more first observing-point images and one or a plurality of second observing-point images. The number of pixels included in each of the second observing-point images is smaller than the number of pixels included in each of the first observing-point images.

The electronic device according to an embodiment of the present disclosure employs the display apparatus described above. Typical examples of the electronic device are a TV (television), a digital camera, a personal computer, a video camera and a portable terminal such as a hand phone.

In the display apparatus and the electronic device which are provided by the present disclosure, since light beams are controlled by the light-beam control section, a display shown on the display section can be recognized by the observer. Thus, in the first display mode, a plurality of observing-point images are displayed on the display section. As described above, the observing-point images include two or more first observing-point images and one or a plurality of second observing-point images. The observing-point images are displayed on the display section in such a way that the number of pixels included in each of the second observing-point images is smaller than the number of pixels included in each of the first observing-point images.

In accordance with the display apparatus and the electronic device which are provided by the present disclosure, the number of pixels included in each of the second observing-point images is made smaller than the number of pixels included in each of the first observing-point images. Thus, the display apparatus is capable of reducing image-quality deterioration caused by crosstalk.

BRIEF DESCRIPTION OF THE DRAWINGS

FIG. 30 is a model diagram showing a typical operation carried out by a three-dimensional display apparatus according to a still further modified version; and FIG. 31 is a model diagram showing a typical operation carried out by a three-dimensional display apparatus according to a still further modified version.

DETAILED DESCRIPTION OF THE PREFERRED EMBODIMENTS

Embodiments of the present disclosure are explained in detail below by referring to accompanying diagrams. It is to be noted that the explanation is divided into descriptions of topics arranged in the following order.

1: First Embodiment
2: Second Embodiment
3: Typical Applications
4: Other Modified Versions 1: First Embodiment Typical Configuration (Overall Typical Configuration)

Figure 1:
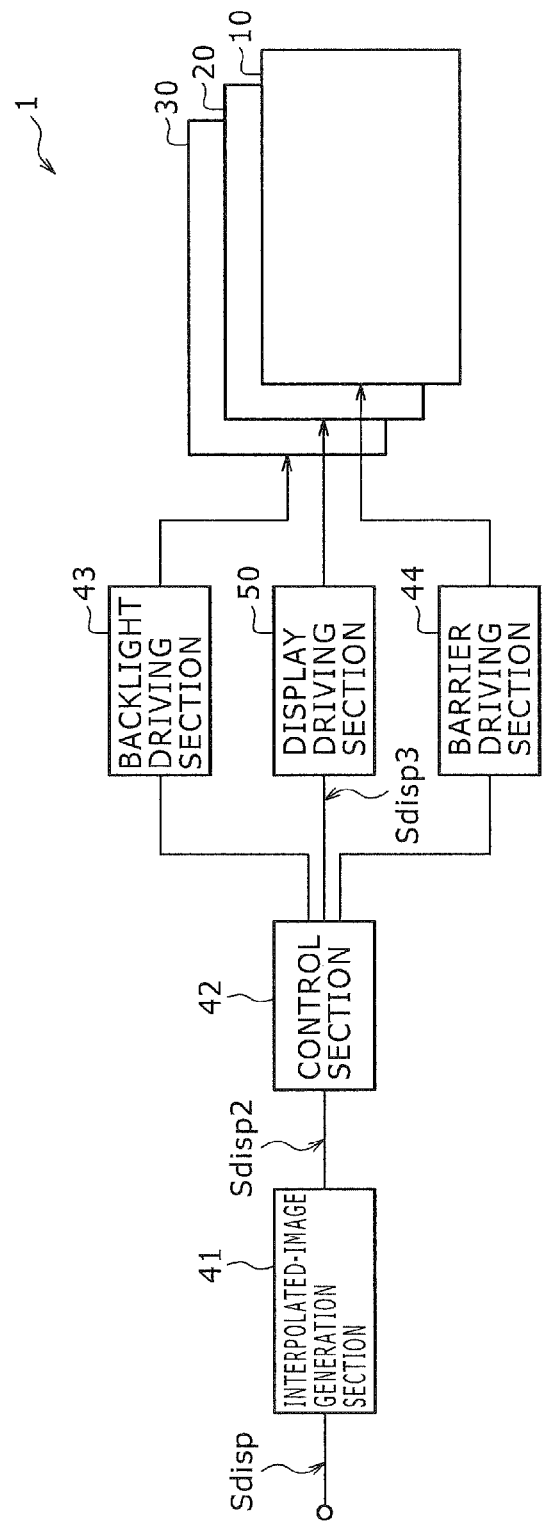
FIG. 1 is a block diagram showing a typical configuration of a three-dimensional display apparatus according to a first embodiment of the present disclosure.

FIG. 1 is a block diagram showing a typical configuration of a three-dimensional display apparatus 1 according to a first embodiment of the present disclosure. The three-dimensional display apparatus 1 is a three-dimensional display apparatus adopting the parallax barrier method. As shown in the figure, the three-dimensional display apparatus 1 includes an interpolated-image generation section 41, a control section 42, a backlight driving section 43, a backlight 30, a display driving section 50, a display section 20, a barrier driving section 44 and a barrier section 10.

The interpolated-image generation section 41 carries out interpolated-image processing on the basis of a video-picture signal Sdisp received from an external source and generates a video-picture signal Sdisp2. To put it concretely, in an operation carried out by the three-dimensional display apparatus 1 to output a three-dimensional display, the interpolated-image generation section 41 generates an interpolated image FI on the basis of a left-eye image FL and a right-eye image FR which are included in the video-picture signal Sdisp.

Figure 2A:
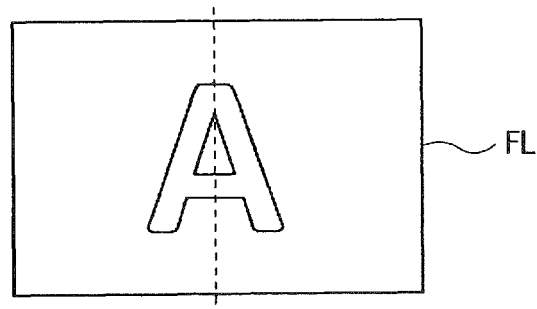
FIGS. 2A to 2C are a plurality of explanatory diagrams showing a typical operation carried out by an interpolated-image generation section shown in FIG. 1.
Figure 2B:
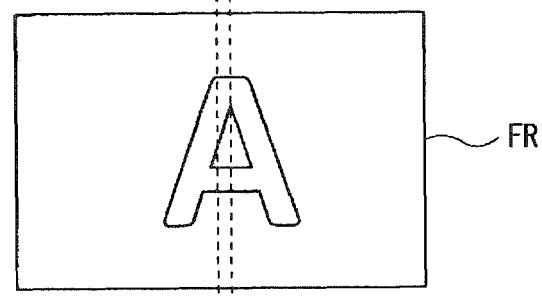
Figure 2C:
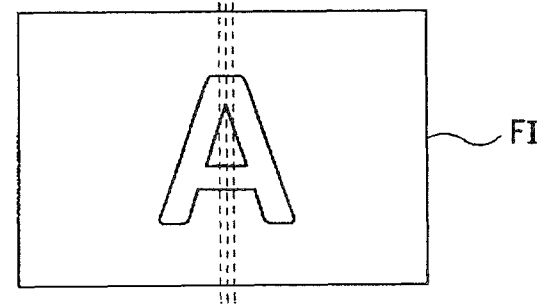

FIGS. 2A to 2C are a plurality of explanatory model diagrams each showing a typical image handled by the interpolated-image generation section 41 in an operation carried out by the three-dimensional display apparatus 1 to output a three-dimensional display. To be more specific, FIGS. 2A, 2B and 2C show the left-eye image FL, the right-eye image FR and the interpolated image FI respectively. The left-eye image FL is an observing-point image to be observed by the left eye of the observer whereas the right-eye image FR is an observing-point image to be observed by the right eye of the observer. The left-eye image FL and the right-eye image FR have a disparity or parallax between them. On the basis of the left-eye image FL and the right-eye image FR, the interpolated-image generation section 41 carries out the interpolated-image processing in order to generate the interpolated image FI which is an observing-point image for an intermediate observing point between the observing points for the left and right eyes.

The interpolated-image generation section 41 then generates a video-picture signal Sdisp2 including the right-eye image FR, the left-eye image FL and the interpolated image FI generated as described above. In addition, when the three-dimensional display apparatus 1 carries out an operation to output an ordinary display which is a two-dimensional display, the interpolated-image generation section 41 supplies the video-picture signal Sdisp as it is to be treated as the video-picture signal Sdisp2.

The control section 42 is a circuit for controlling the backlight driving section 43, the display driving section 50 and the barrier driving section 44 on the basis of the video-picture signal Sdisp2 received from the interpolated-image generation section 41. To put it concretely, the control section 42 supplies a backlight control signal to the backlight driving section 43 and a video-picture signal Sdisp3 to the display driving section 50. The video-picture signal Sdisp3 is a signal generated on the basis of the video-picture signal Sdisp2. On the other hand, the control section 42 supplies a barrier control signal to the barrier driving section 44. When the three-dimensional display apparatus 1 carries out an operation to output an ordinary display which is a two-dimensional display, the video-picture signal Sdisp3 is generated as a video-picture signal S2D including one observing-point video picture. When the three-dimensional display apparatus 1 carries out an operation to output a three-dimensional display, on the other hand, the video-picture signal Sdisp3 is generated as a video-picture signal S3D including the left-eye image FL, the right-eye image FR and the interpolated image FI which have been described above.

The backlight driving section 43 is a section for driving the backlight 30 on the basis of the backlight control signal received from the control section 42. The backlight 30 has a function to radiate light, which is emitted from the surface of the backlight 30, to the display section 20. The backlight 30 is configured to typically include LEDs (Light Emitting Diodes) or CCFLs (Cold Cathode Fluorescent Lamps).

The display driving section 50 is a section for driving the display section 20 on the basis of the video-picture signal Sdisp3 received from the control section 42. In the case of the three-dimensional display apparatus according to the first embodiment, the display section 20 is a liquid-crystal display section. Thus, the display section 20 drives its liquid-crystal display devices in order to modulate the light radiated by the backlight 30. By modulating the light radiated by the backlight 30, the display section 20 is capable of showing a display.

The barrier driving section 44 is a section for driving the barrier section 10 on the basis of the barrier control signal received from the control section 42. The barrier section 10 is a section for transmitting the light emanating from the backlight 30 and passing through the display section 20 or for blocking the light. The operation to transmit the light emanating from the backlight 30 and passing through the display section 20 is referred to as an opening operation whereas the operation to block the light is referred to as a closing operation. The barrier section 10 is configured to employ a plurality of opening/closing sections 11 and 12 by making use of liquid crystals. The opening/closing sections 11 and 12 will be described later.

As shown in FIG. 1, in the three-dimensional display apparatus 1, the backlight 30, the display section 20 and the barrier section 10 are arranged in the same order as the order in which the backlight 30, the display section 20 and the barrier section 10 are enumerated in this sentence. That is to say, the light radiated by the backlight 30 attains the observer by way of the display section 20 and the barrier section 10.

(Display Driving Section 50 and Display Section 20)

Figure 3:
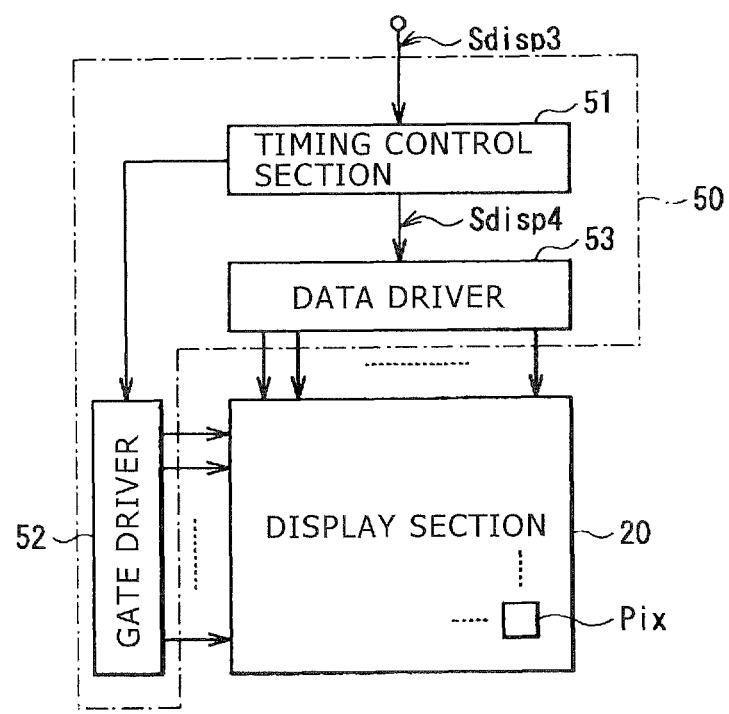
FIG. 3 is a block diagram showing a typical configuration of a display driving section shown in FIG. 1.

FIG. 3 is a block diagram showing a typical configuration of the display driving section 50. As shown in the figure, the display driving section 50 includes a timing control section 51, a gate driver 52 and a data driver 53. The timing control section 51 controls driving timings of the gate driver 52 and the data driver 53. In addition, the timing control section 51 generates a video-picture signal Sdisp4 on the basis of the video-picture signal Sdisp3 received from the control section 42 and supplies the video-picture signal Sdisp4 to the data driver 53. In accordance with the timing control executed by the timing control section 51, the gate driver 52 sequentially selects pixels Pix of the display section 20 in row units in order to carry out a row-sequential scanning operation. The data driver 53 is a section for supplying a pixel signal based on the video-picture signal Sdisp4 to each of the pixels Pix in the display section 20. To put it concretely, the data driver 53 carries out a D/A (digital to analog) conversion process on the basis of the video-picture signal Sdisp4 in order to generate the pixel signal which is an analog signal and supplies the pixel signal to each of the pixels Pix in the display section 20.

Figure 4A:
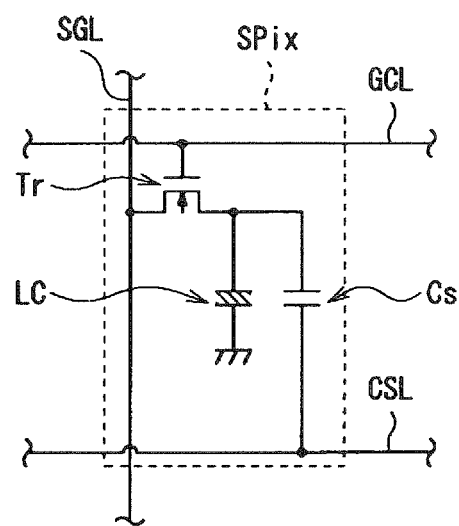
FIGS. 4A and 4B are a circuit diagram and a cross-sectional diagram which show a typical configuration of a display section shown in FIG. 1.
Figure 4B:
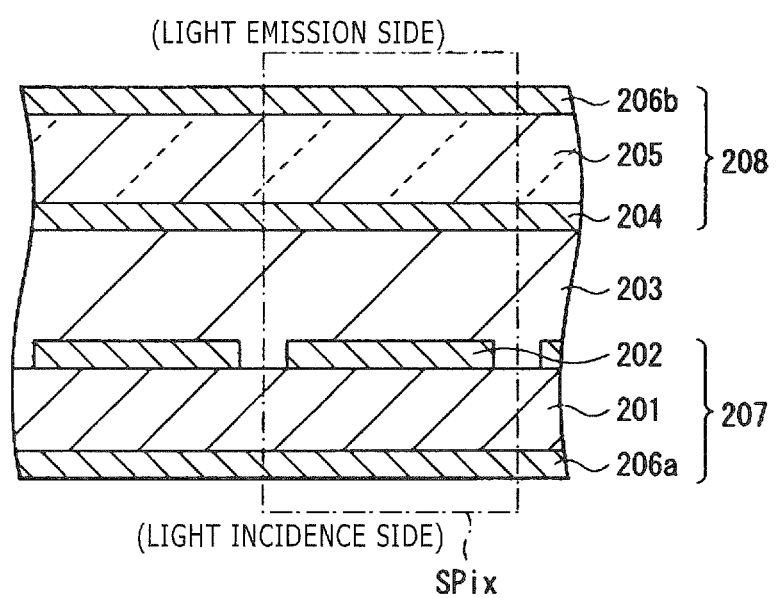

FIGS. 4A and 4B are a circuit diagram and a cross-sectional diagram which show a typical configuration of the display section 20. To be more specific, FIG. 4A is the circuit diagram showing the circuit of a sub-pixel SPix composing the pixel Pix whereas FIG. 4B is the cross-sectional diagram showing a cross section of the display section 20.

The pixel Pix includes three sub-pixels SPix provided for the red (R), green (G) and blue (B) colors correspondingly. As shown in FIG. 4A, each of the sub-pixels SPix includes a TFT (Thin Film Transistor) device Tr, a liquid-crystal device LC and an electric-charge holding capacitor device Cs. The TFT device Tr is typically a MOS-FET (Metal Oxide Semiconductor-Field Effect Transistor). The gate electrode of the TFT device Tr is connected to a gate line GCL whereas the source electrode of the TFT device Tr is connected to a data line SGL. On the other hand, the drain electrode of the TFT device Tr is connected to a specific terminal of the liquid-crystal device LC and a specific terminal of the electric-charge holding capacitor device Cs. As described above, the specific terminal of the liquid-crystal device LC is connected to the drain electrode of the TFT device Tr whereas the other terminal of the liquid-crystal device LC is connected to the ground. Also as described above, the specific terminal of the electric-charge holding capacitor device Cs is also connected to the drain electrode of the TFT device Tr whereas the other terminal of the electric-charge holding capacitor device Cs is connected to an electric-charge holding capacitor line CSL. The gate line GCL is connected to the gate driver 52 whereas the data line SGL is connected to the data driver 53.

As shown in FIG. 4B, the display section 20 has a liquid-crystal layer 203 sealed in a space between a driving substrate 207 and an opposite substrate 208. The driving substrate 207 includes a transparent substrate 201, a pixel electrode 202 and a polarization plate 206a. The transparent substrate 201 is made of typically glass to serve as a substrate on which the TFT device Tr is created. On a specific surface of the transparent substrate 201, the pixel electrode 202 is provided for every sub-pixel SPix. The specific surface of the transparent substrate 201 is the surface on the side close to the liquid-crystal layer 203. In addition, the polarization plate 206a is pasted on the other surface of the transparent substrate 201. This other surface of the transparent substrate 201 is the surface opposite to the specific surface on which the pixel electrode 202 is provided.

On the other hand, the opposite substrate 208 includes a transparent substrate 205, an opposite electrode 204 and a polarization plate 206b. The transparent substrate 205 is made of typically glass. On a specific surface of the transparent substrate 205, a color filter and a black matrix which are not shown in the figure are created. The specific surface of the transparent substrate 205 is the surface on the side close to the liquid-crystal layer 203. On the color filter and the black matrix, the opposite electrode 204 is further provided to serve as an electrode common to all the sub-pixels SPix. In addition, the polarization plate 206b is pasted on the other surface of the transparent substrate 205. This other surface of the transparent substrate 205 is the surface opposite to the specific surface on which the opposite electrode 204 is provided.

The polarization plate 206a and the polarization plate 206b are pasted on the transparent substrate 201 and the transparent substrate 205 respectively so that the polarization plate 206a and the polarization plate 206b become Nicol prisms crossing each other or Nicol prisms parallel to each other.

Figure 5:
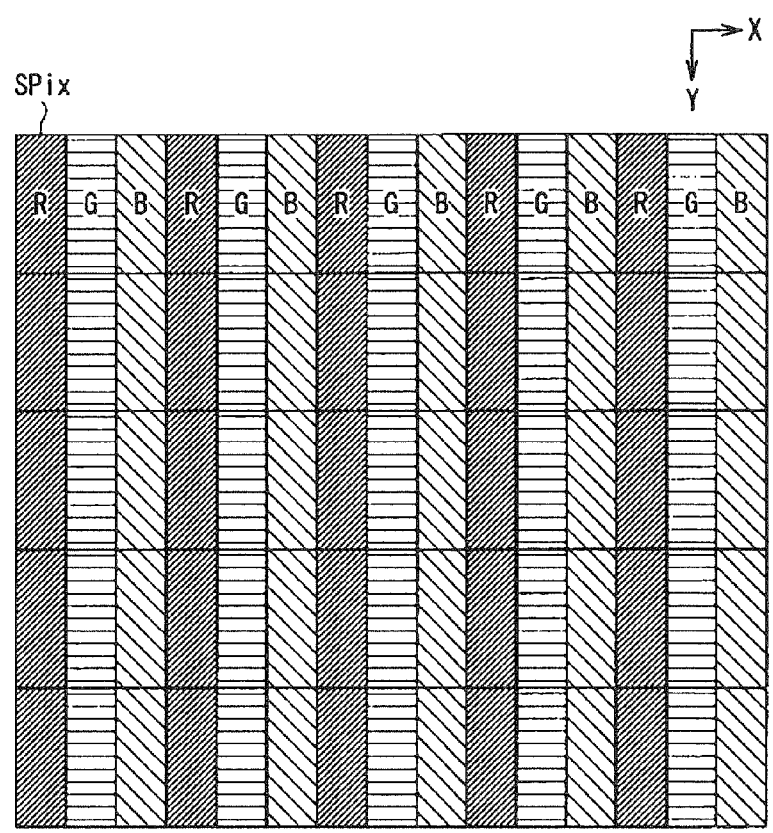
FIG. 5 is a diagram showing a top view of a typical configuration of the display section shown in FIG. 1.

FIG. 5 is a diagram showing a top view of a typical array of sub-pixels SPix on the display section 20. In FIG. 5, reference numeral R denotes a sub-pixel SPix for the red color, reference numeral G denotes a sub-pixel SPix for the green color, and reference numeral B denotes a sub-pixel SPix for the blue color. The display section 20 includes a plurality of sub-pixels SPix laid out to form a sub-pixel matrix. Each of the sub-pixels SPix has a long rectangular shape oriented in the vertical direction Y of the display screen of the display section 20. To put it concretely, in this embodiment, three sub-pixels SPix for the red (R), green (G) and blue (B) colors are laid out in the horizontal direction X of the display screen of the display section 20 in the same order as the order, in which the three sub-pixels SPix are enumerated in this sentence, to form a sub-pixel set and such sub-pixel sets are laid out throughout the display screen to form the sub-pixel matrix. In addition, in the sub-pixel matrix, sub-pixels SPix provided for the same color are arranged on the same column which is oriented in the vertical direction Y of the display screen of the display section 20.

(Barrier Section 10)

Figure 6A:
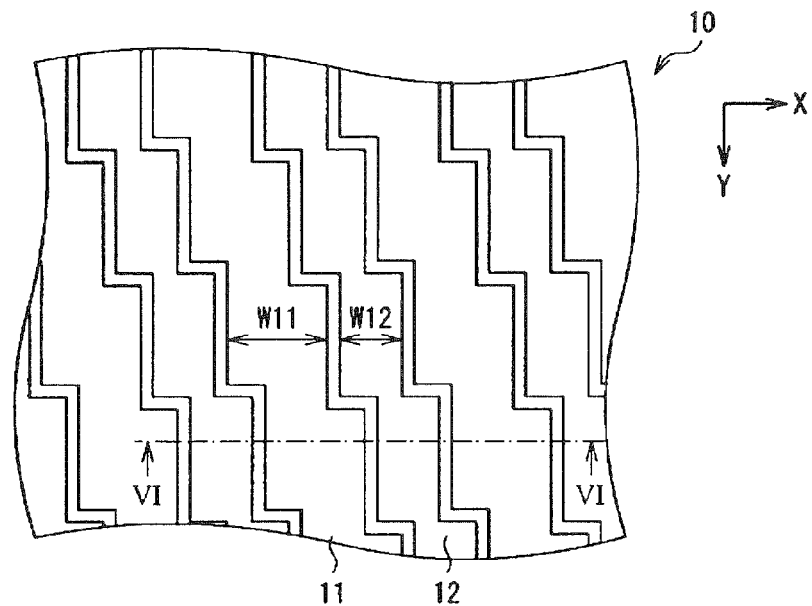
FIGS. 6A and 6B are a top-view diagram and a cross-sectional diagram which show a typical configuration of a barrier section shown in FIG. 1.
Figure 6B:
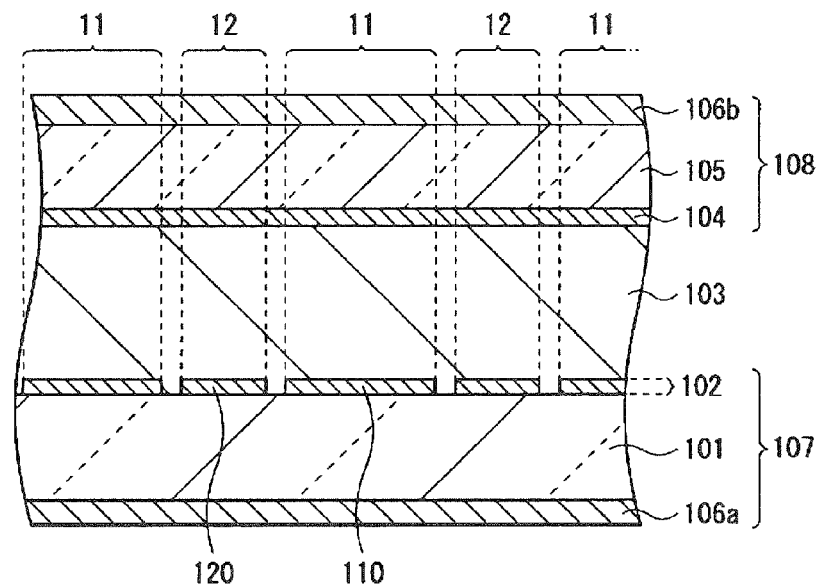

FIGS. 6A and 6B are a top-view diagram and a cross-sectional diagram which show a typical configuration of the barrier section 10. To be more specific, FIG. 6A is a diagram showing a top view of the barrier section 10 whereas FIG. 6B is a diagram showing a cross section obtained along a VI-VI line of the barrier section 10 shown in FIG. 6A.

The barrier section 10 is the so-called parallax barrier. As shown in FIG. 6A, the barrier section 10 has a plurality of opening/closing sections 11 and 12 which are also referred to as liquid-crystal barriers 11 and 12 for transmitting or blocking light beams. In this embodiment, the opening/closing sections 11 and 12 each have the shape of the so-called step barrier. In this embodiment, the width W11 of the opening/closing section 11 is different from the width W12 of the opening/closing section 12. To be more specific, for example, the width W11 of the opening/closing section 11 is greater than the width W12 of the opening/closing section 12 (that is, W11>W12). However, the relation between the width W11 of the opening/closing section 11 and the width W12 of the opening/closing section 12 is by no means limited to this specific relation. For example, it is possible to provide a configuration in which the width W11 of the opening/closing section 11 is smaller than the width W12 of the opening/closing section 12 (that is, W11<W12) or the width W11 of the opening/closing section 11 is equal to the width W12 of the opening/closing section 12 (that is W11=W12).

As shown in FIG. 6B, the barrier section 10 has a liquid-crystal layer 103 sealed in a space between a driving substrate 107 and an opposite substrate 108. The driving substrate 107 includes a transparent substrate 101, a transparent electrode layer 102 and a polarization plate 106a. The transparent substrate 101 is made of typically glass. On a specific surface of the transparent substrate 101, the transparent electrode layer 102 is provided. The specific surface of the transparent substrate 101 is the surface on the side close to the liquid-crystal layer 103. In addition, the polarization plate 106a is pasted on the other surface of the transparent substrate 101. This other surface of the transparent substrate 101 is the surface opposite to the specific surface on which the transparent electrode layer 102 is provided.

On the other hand, the opposite substrate 108 includes a transparent substrate 105, a transparent electrode layer 104 and a polarization plate 106b. The transparent substrate 105 is made of typically glass. On a specific surface of the transparent substrate 105, the transparent electrode layer 104 is created. The specific surface of the transparent substrate 105 is the surface on the side close to the liquid-crystal layer 103. In addition, the polarization plate 106b is pasted on the other surface of the transparent substrate 105. This other surface of the transparent substrate 105 is the surface opposite to the specific surface on which the transparent electrode layer 104 is provided.

The polarization plate 106a and the polarization plate 106b are pasted on the transparent substrate 101 and the transparent substrate 105 respectively as described above so that the polarization plate 106a and the polarization plate 106b become Nicol prisms crossing each other or Nicol prisms parallel to each other.

The transparent electrode layer 102 has a plurality of transparent electrodes 110 and 120. In addition, the transparent electrode layer 104 is provided to serve as the so-called common electrode throughout an area facing all the positions of the transparent electrodes 110 and 120. Each transparent electrode 110, a portion included in the liquid-crystal layer 103 as a portion corresponding to the transparent electrode 110 and a portion included in the liquid-crystal layer 103 as a portion corresponding to the transparent electrode 110 form an opening/closing section 11. By the same token, each transparent electrode 120, a portion included in the liquid-crystal layer 103 as a portion corresponding to the transparent electrode 120 and a portion included in the liquid-crystal layer 103 as a portion corresponding to the transparent electrode 120 form an opening/closing section 12. Due to such a configuration of the barrier section 10, by applying a voltage selectively to the transparent electrode 110 or the transparent electrode 120, the liquid-crystal layer 103 can have a liquid-crystal orientation according to the voltage and is capable of carrying out opening and closing operations for each of the opening/closing sections 11 and the opening/closing sections 12.

The operations which are carried out by the opening/closing sections 11 and 12 when the three-dimensional display apparatus 1 outputs an ordinary display (that is, a two-dimensional display) are different from the operations which are carried out by the opening/closing sections 11 and 12 when the three-dimensional display apparatus 1 outputs a three-dimensional display. To put it concretely, as will be described later, when the three-dimensional display apparatus 1 outputs an ordinary display, the opening/closing section 11 is put in an open state (or a light transmitting state) but, when the three-dimensional display apparatus 1 outputs a three-dimensional display, the opening/closing section 11 is put in a closed state (or a light blocking state). On the other hand, as will be described later, without regard to whether the three-dimensional display apparatus 1 outputs an ordinary display or a three-dimensional display, the opening/closing section 12 is put in an open state (or a light transmitting state).

Figure 7:
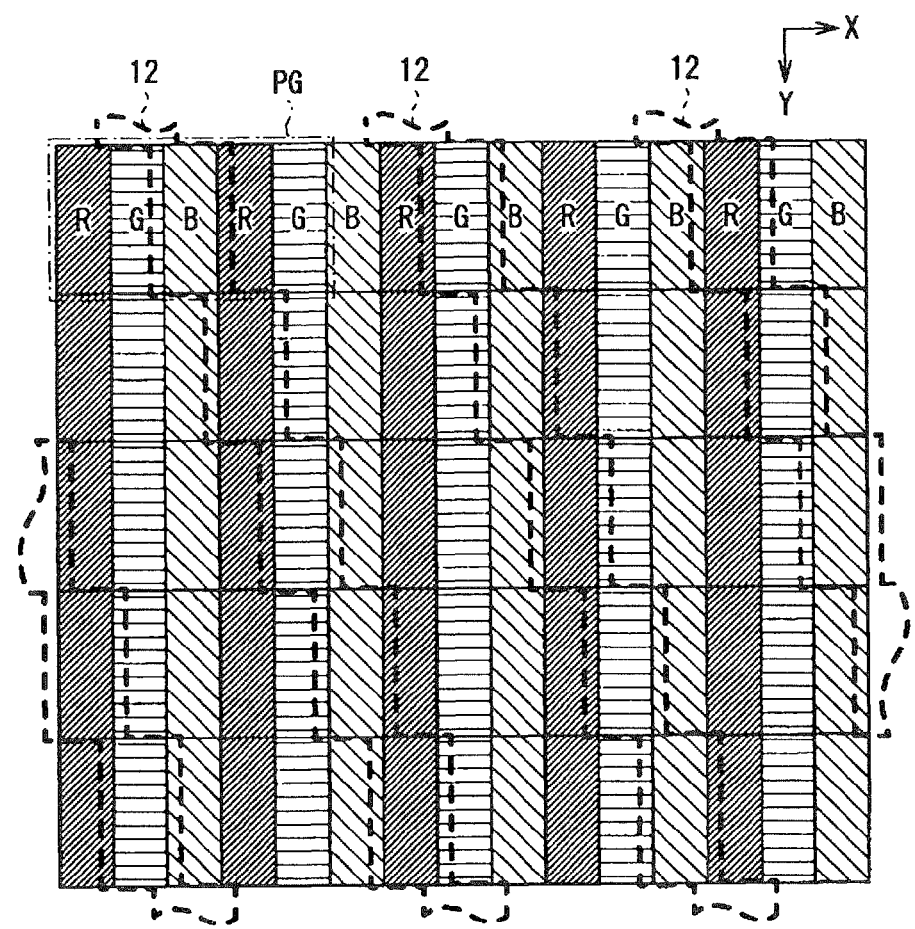
FIG. 7 is an explanatory diagram showing a relation between the display section and the barrier section which are shown in FIG. 1.

FIG. 7 is an explanatory diagram showing a relation between the sub-pixels SPix in the display section 20 and the opening/closing sections 12 in the barrier section 10. It is to be noted that this figure does not show the opening/closing sections 11 in the barrier section 10. That is to say, the figure shows the opening/closing sections 12 put in an open state for a three-dimensional display and does not show the opening/closing sections 11 put in a closed state for a three-dimensional display. Along a row oriented in the horizontal direction X, an opening/closing section 12 is provided for every sub-pixel set PG including five adjacent sub-pixels SPix. In addition, the sub-pixel set PG is positioned so that the location of the horizontal-direction center of the sub-pixel set PG faces the location of the opening/closing section 12.

Figure 8A:
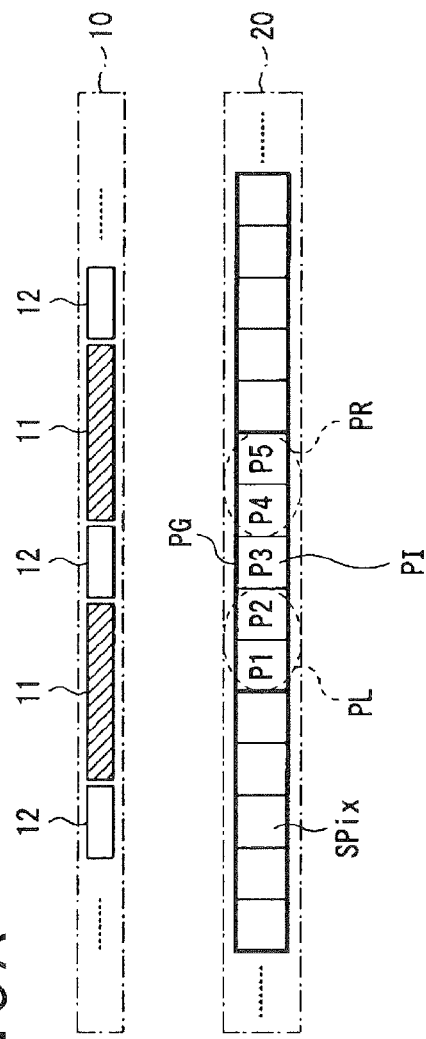
FIGS. 8A and 8B are a plurality of other explanatory diagrams each showing a relation between the display section and the barrier section which are shown in FIG. 1.
Figure 8B:
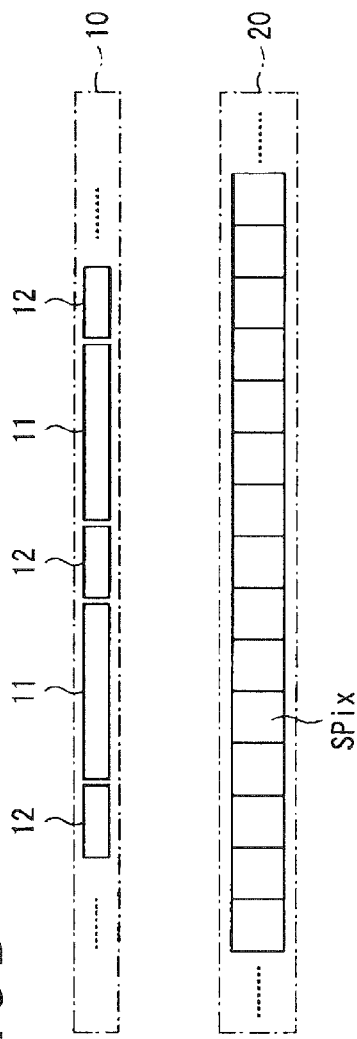

FIGS. 8A and 8B are a plurality of model diagrams each showing the state of the barrier section 10 by making use of its cross-sectional structure for a three-dimensional display and an ordinary display (or a two-dimensional display). To be more specific, FIG. 8A shows the state of the barrier section 10 for a three-dimensional display whereas FIG. 8B shows the state of the barrier section 10 for an ordinary display. In FIG. 8A, an opening/closing section 11 shown as a hatched block is an opening/closing section 11 put in a state of blocking light.

In an operation carried out by the three-dimensional display apparatus 1 to output a three-dimensional display, a video-picture signal S3D is supplied to the display driving section 50 and the display section 20 shows the display on the basis of the video-picture signal S3D. To put it concretely, as shown in FIG. 8A, in the barrier section 10, the opening/closing section 12 is put in an open state (or a light transmitting state) whereas the opening/closing section 11 is put in a closed state (or a light blocking state). In addition, in the display section 20, as will be described later, a sub-pixel set PG displays left-eye pixel information PL, interpolated pixel information PI and right-eye pixel information PR. As described before, the sub-pixel set PG includes five sub-pixels SPix which are adjacent to each other and provided at a position facing the opening/closing section 12. The left-eye pixel information PL is two pieces of sub-pixel information P1 and P2 for the left-eye image FL whereas the interpolated pixel information PI is one piece of sub-pixel information P3 for the interpolated image FI. On the other hand, the right-eye pixel information PR is two other pieces of sub-pixel information P4 and P5 for the right-eye image FR. Thus, as will be described later, the observer is capable of observing the left-eye pixel information PL by making use of the left eye and the right-eye pixel information PR by making use of the right eye. As a result, the observer is capable of seeing a three-dimensional video picture. In addition, as will be described later, the display section 20 also displays the interpolated pixel information PI. Thus, it is possible to reduce the image-quality deterioration caused by crosstalk and eventually felt by the observer.

In an operation carried out by the three-dimensional display apparatus 1 to output an ordinary display (or a two-dimensional display), on the other hand, a video-picture signal S2D is supplied to the display driving section 50 and the display section 20 shows the display on the basis of the video-picture signal S2D. To put it concretely, as shown in FIG. 8B, in the barrier section 10, both the opening/closing sections 11 and 12 are put in an open state (or a light transmitting state) so that, in the display section 20, all the sub-pixels SPix display one observing-point video picture which is a two-dimensional video picture. Thus, the observer is capable of seeing an ordinary two-dimensional video picture, which is appearing on the display section 20, as it is.

The mode for showing a three-dimensional display as described above is a first display mode according to an embodiment of the present disclosure. The sub-pixel set PG is a basic pixel set according to an embodiment of the present disclosure. A set of two sub-pixels for displaying the left-eye pixel information PL and a set of two sub-pixels for displaying the right-eye pixel information PR are a first pixel group according to an embodiment of the present disclosure. A sub-pixel for displaying the interpolated pixel information PI is a second pixel group according to an embodiment of the present disclosure. The opening/closing sections 12 are the first group liquid-crystal barrier according to an embodiment of the present disclosure whereas the opening/closing sections 11 are the second group liquid-crystal barrier according to an embodiment of the present disclosure.

Operations and Effects

Next, the following description explains operations of the three-dimensional display apparatus 1 according to this embodiment and effects of the three-dimensional display apparatus 1. The interpolated-image generation section 41 carries out interpolated-image processing on the basis of the video-picture signal Sdisp received from an external source and generates a video-picture signal Sdisp2. To put it concretely, in an operation carried out by the three-dimensional display apparatus 1 to output a three-dimensional display, the interpolated-image generation section 41 generates an interpolated image FI by carrying out the interpolated-image processing on the basis of a left-eye image FL and a right-eye image FR which are included in the video-picture signal Sdisp. The interpolated-image generation section 41 then generates the video-picture signal Sdisp2 which includes the left-eye image FL, the right-eye image FR and the interpolated image FI. The control section 42 controls the backlight driving section 43, the display driving section 50 and the barrier driving section 44 on the basis of the video-picture signal Sdisp2 received from the interpolated-image generation section 41. The backlight driving section 43 drives the backlight 30 on the basis of a backlight control signal received from the control section 42. The backlight 30 radiates light emitted from the surface of the backlight 30 to the display section 20. The display driving section 50 drives the display section 20 on the basis of a video-picture signal Sdisp3 received from the control section 42. The display section 20 shows a display by modulating the light radiated thereto by the backlight 30. To put it concretely, in an operation carried out by the three-dimensional display apparatus 1 to output a three-dimensional display, the sub-pixel set PG of the display section 20 displays the left-eye pixel information PL, the right-eye pixel information PR and the interpolated pixel information PI. The barrier driving section 44 controls the barrier section 10 on the basis of a barrier control signal received from the control section 42. The opening/closing sections 11 and 12 of the barrier section 10 carry out opening and closing operations on the basis of a command received from the barrier driving section 44 in order to transmit or block light emanating from the backlight 30 and passing through the display section 20.

(Detailed Operations to Generate Three-Dimensional Displays)

Next, the following description explains detailed operations carried out in order to generate a three-dimensional display.

Figure 9:
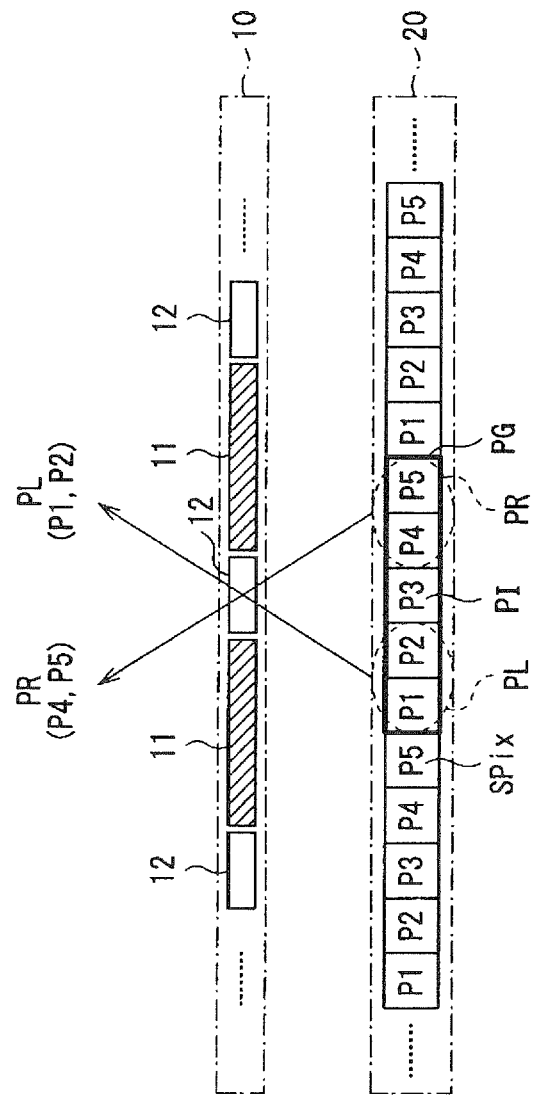
FIG. 9 is a model diagram showing a typical operation carried out by the three-dimensional display apparatus shown in FIG. 1.

FIG. 9 is a model diagram showing typical operations carried out by the display section 20 and the barrier section 10 in order to generate a three-dimensional display. In order to generate a three-dimensional display, in the barrier section 10, the opening/closing section 12 is put in an open state (or a light transmitting state) whereas the opening/closing section 11 is put in a closed state (or a light blocking state). Then, the display section 20 displays pixel information of the video-picture signal S3D. At that time, as shown in FIG. 9, the sub-pixel set PG displays left-eye pixel information PL, interpolated pixel information PI and right-eye pixel information PR. As described before, the sub-pixel set PG includes five sub-pixels SPix which are adjacent to each other and provided at a position in the vicinity of the opening/closing section 12. The left-eye pixel information PL is two pieces of sub-pixel information P1 and P2 for the left-eye image FL whereas the interpolated pixel information PI is one piece of sub-pixel information P3 for the interpolated image FI. On the other hand, the right-eye pixel information PR is two pieces of sub-pixel information P4 and P5 for the right-eye image FR. Light beams emitted by the sub-pixels SPix of the display section 20 are output at their respective angles limited by the opening/closing section 12. Thus, the observer is capable of observing the left-eye pixel information PL by making use of the left eye and the right-eye pixel information PR by making use of the right eye. Since the observer is capable of observing a left-eye image FL and a right-eye image FR in this way, the observer is capable of sensing the displayed video picture as a three-dimensional video picture.

(Crosstalk between the Left-Eye Image FL and the Right-Eye Image FR)

As shown in FIG. 9, the sub-pixel set PG displays the interpolated pixel information PI at a position between the left-eye pixel information PL and the right-eye pixel information PR. Thus, the three-dimensional display apparatus 1 is capable of reducing the image-quality deterioration caused by crosstalk and eventually felt by the observer. The reduction of the image-quality deterioration is explained in detail as follows.

Figure 10:
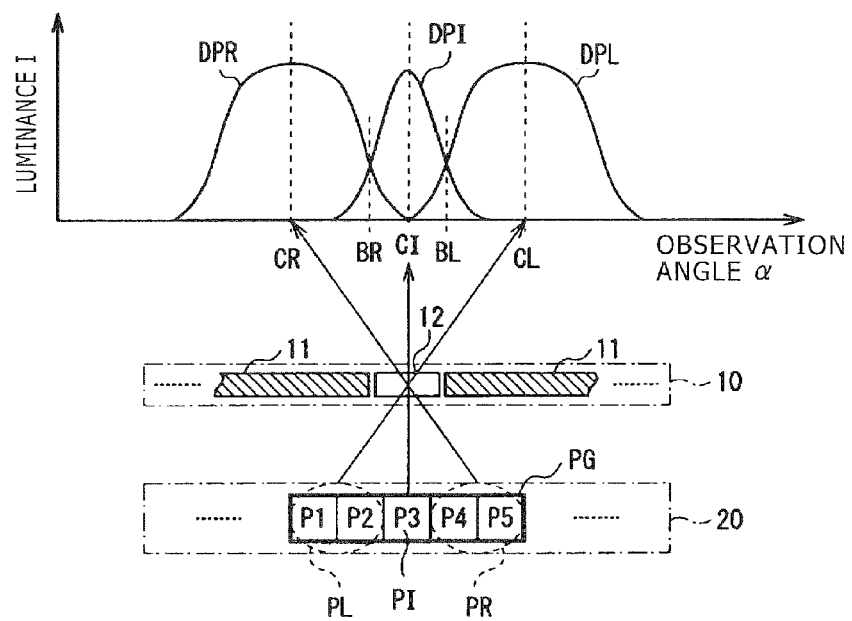
FIG. 10 is another model diagram showing a typical operation carried out by the three-dimensional display apparatus shown in FIG. 1.

FIG. 10 is another model diagram showing light beams emitted by the sub-pixel set PG of the display section 20 employed in the three-dimensional display apparatus 1. The light beams emitted by five sub-pixels SPix of the sub-pixel set PG included in the display section 20 pass through an opening/closing section 12 put in an open state in the barrier section 10 and propagate forward to the observer. The observer observes these light beams at their respective observation angles α corresponding to the direction of the propagations of the light beams. At that time, for the observation angles α corresponding to the direction of the propagations of the light beams emitted by the sub-pixels SPix, the light beams have luminance distributions like ones shown in FIG. 10. To put it concretely, the light beam for the left-eye pixel information PL has a luminance distribution DPL having its center coinciding with an observation angle CL corresponding to the direction of the propagation of the light beam. By the same token, the light beam for the interpolated pixel information PI has a luminance distribution DPI having its center coinciding with an observation angle CI corresponding to the direction of the propagation of the light beam. In the same way, the light beam for the right-eye pixel information PR has a luminance distribution DPR having its center coinciding with an observation angle CR corresponding to the direction of the propagation of the light beam. As shown in FIG. 10, at an observation angle BL, the luminance I of the luminance distribution DPL is equal to the luminance I of the luminance distribution DPI. That is to say, the observation angle BL is an observation angle corresponding to the border between the luminance distribution DPL and the luminance distribution DPI. By the same token, at an observation angle BR, the luminance I of the luminance distribution DPR is equal to the luminance I of the luminance distribution DPI. That is to say, the observation angle BR is an observation angle corresponding to the border between the luminance distribution DPR and the luminance distribution DPI.

The three-dimensional display apparatus 1 is designed so that, when the observer is observing a displayed image, the observation angle α of the left eye is close to an observation angle CL at the center of the luminance distribution DPL whereas the observation angle α of the right eye is close to an observation angle CR at the center of the luminance distribution DPR. At that time, in the three-dimensional display apparatus 1, two pieces of sub-pixel information (that is, sub-pixel information P1 and sub-pixel information P2) compose the left-eye pixel information PL whereas two pieces of sub-pixel information (that is, sub-pixel information P4 and sub-pixel information P5) compose the right-eye pixel information PR. Thus, in comparison with a case in which one piece of sub-pixel information composes the left-eye pixel information PL or the right-eye pixel information PR, the distribution widths of the luminance distributions DPL and DPR can be increased. Accordingly, since the distribution widths of the luminance distributions DPL and DPR are large, the left eye can be made capable of observing the light of the luminance distribution DPL with ease whereas the right eye can be made capable of observing the light of the luminance distribution DPR with ease so that it is possible to further increase the range of the observation angle α at which a desired image can be observed even if the relation between the relative positions of the observer and the three-dimensional display apparatus 1 changes to a certain degree.

If the relation between the relative positions of the observer and the three-dimensional display apparatus 1 changes substantially, on the other hand, in a typical case, the observer also observes the light of the luminance distribution DPI in addition to the light of the luminance distribution DPL by making use of the left eye. In another typical case, the observer also observes the light of the luminance distribution DPI in addition to the light of the luminance distribution DPR by making use of the right eye. That is to say, in such cases, the observer also observes light which should not be observed in addition to light, which should be observed essentially, in a phenomenon called crosstalk.

Figure 11:
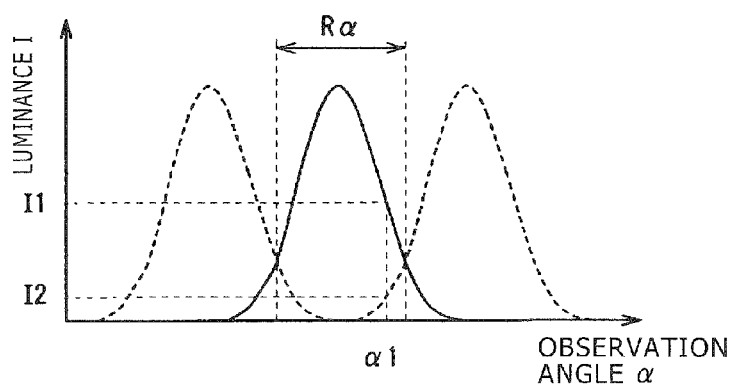
FIG. 11 is an explanatory diagram to be referred to in description of crosstalk.

FIG. 11 is an explanatory diagram referred to in the following description of the crosstalk. An observation-angle range Rα shown in the figure for light emitted by a certain sub-pixel SPix is the main range in which the light can be observed. In the vicinity of each end of the observation-angle range Rα, however, light emitted by another pixel SPix included as a pixel adjacent to the certain sub-pixel SPix in the same observing-point image can also be observed. To put it concretely, at an observation angle α1 for example, in addition to light emitted by a desired sub-pixel SPix at a luminance I1, light emitted by a sub-pixel SPix adjacent to the desired sub-pixel SPix at a luminance I2 is also observed. In this case, the crosstalk CT is expressed by the following equation:

$$CT = I2/I1 \times 100 \quad (1)$$

As is obvious from the equation given above, the larger the effect of the adjacent sub-pixel SPix, the larger the magnitude of the crosstalk CT.

When the relation between the relative positions of the observer and the three-dimensional display apparatus 1 changes much, in the case shown in FIG. 10 for example, if the observer observes the image at the observation angle BL by making use of the left eye, the crosstalk CT is 100%. In this case, the observer observes the left-eye image FL and the interpolated image FI, which has a disparity from the left-eye image FL, as a double image. The observation making use of the right eye is exactly the same as the observation making use of the right eye. That is to say, in the case shown in FIG. 10 for example, if the observer observes the image at the observation angle BR by making use of the right eye, the crosstalk CT is 100%. In this case, the observer observes the right-eye image FR and the interpolated image FI, which has a disparity from the right-eye image FR, as a double image.

Figure 12A:
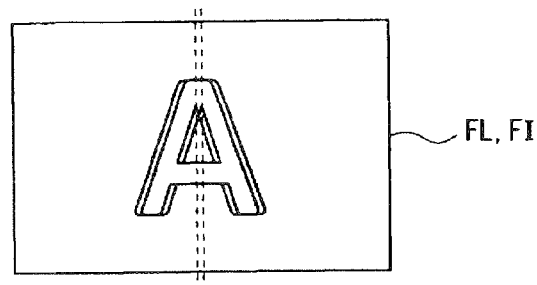
FIGS. 12A and 12B are a plurality of explanatory diagrams each showing a typical display screen of the three-dimensional display apparatus shown in FIG. 1.
Figure 12B:
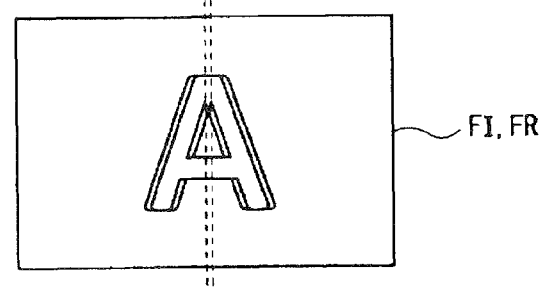

FIGS. 12A and 12B are a plurality of explanatory diagrams each showing a typical display screen shown by the three-dimensional display apparatus 1 as a screen containing crosstalk. To be more specific, FIG. 12A shows a display screen for a case in which the image is observed at the observation angle BL. On the other hand, FIG. 12B shows a display screen for a case in which the image is observed at the observation angle BR. When the observer observes the image at the observation angle BL, the observer sees a double image like the one shown in FIG. 12A as an image composed of the left-eye image FL and the interpolated image FI. In addition, when the observer observes the image at the observation angle BR, on the other hand, the observer sees a double image like the one shown in FIG. 12B as an image composed of the right-eye image FR and the interpolated image FI. In this case, the interpolated image FI is an image at an intermediate point between the left-eye image FL and the right-eye image FR. Thus, the disparity between the left-eye image FL and the interpolated image FI is half the disparity between the left-eye image FL and the right-eye image FR. By the same token, the disparity between the right-eye image FR and the interpolated image FI is also half the disparity between the left-eye image FL and the right-eye image FR. As a result, the three-dimensional display apparatus 1 is capable of reducing the image-quality deterioration caused by crosstalk and eventually felt by the observer.

Figure 13:
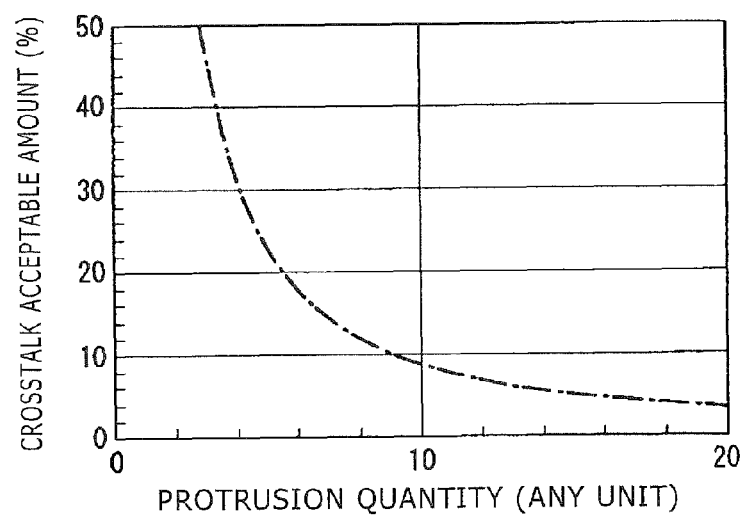
FIG. 13 is an explanatory diagram showing a relation between a disparity and a crosstalk acceptable amount for a display screen.

FIG. 13 is a diagram showing a subjective-evaluation result representing a relation between the disparity of a displayed image and the image-quality deterioration caused by crosstalk and eventually felt by the observer. In FIG. 13, the horizontal axis represents a protrusion quantity computed from the disparity of a displayed image. The computed protrusion quantity is found to be proportional to the disparity of a displayed image. On the other hand, the vertical axis represents a crosstalk acceptable amount which is the maximum amount of crosstalk CT acceptable to the observer. As shown in FIG. 13, as the protrusion quantity decreases, the crosstalk acceptable amount increases or, in other words, the smaller the disparity, the larger the crosstalk acceptable amount. That is to say, FIG. 13 shows that, if the disparity of the displayed image decreases, the observer more hardly feels image-quality deterioration caused by crosstalk CT so that the crosstalk acceptable amount increases.

As described above, the three-dimensional display apparatus 1 also displays an interpolated image FI in addition to a left-eye image FL and a right-eye image FR. Thus, the three-dimensional display apparatus 1 is capable of reducing the image-quality deterioration caused by crosstalk and eventually felt by the observer even if the relation between the relative positions of the observer and the three-dimensional display apparatus 1 changes much. That is to say, as described above, the sub-pixel set PG of the display section 20 employed in the three-dimensional display apparatus 1 displays the interpolated pixel information PI between the left-eye pixel information PL and the right-eye pixel information PR. Thus, since the sub-pixel set PG displays the left-eye pixel information PL and the right-eye pixel information PR at locations separated from each other, it is possible to provide a configuration in which crosstalk is more hardly generated between the left-eye pixel information PL and the right-eye pixel information PR. In addition, the disparity between the left-eye pixel information PL and the interpolated pixel information PI between which crosstalk is generated as well as the disparity between the right-eye pixel information PR and the interpolated pixel information PI between which crosstalk is generated are made small in comparison with the disparity between the left-eye pixel information PL and the right-eye pixel information PR. Thus, as shown in FIG. 13, it is possible to increase the crosstalk acceptable amount and decrease the image-quality deterioration caused by crosstalk and eventually felt by the observer.

(Crosstalk Between Adjacent Sub-Pixel Sets)

Figure 14:
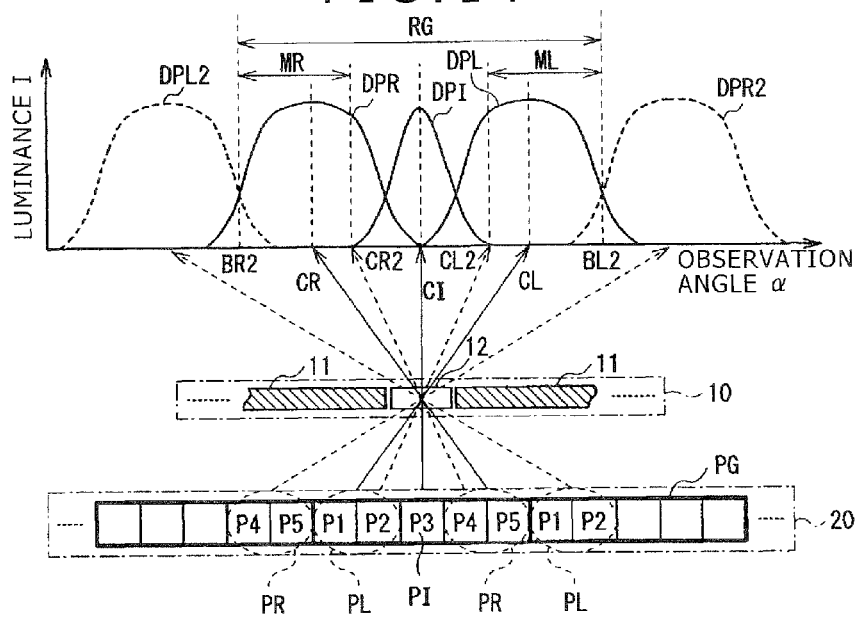
FIG. 14 is a model diagram showing another typical operation carried out by the three-dimensional display apparatus shown in FIG. 1.

FIG. 14 is a model diagram showing light beams emitted by a plurality of adjacent sub-pixel sets PG employed in the three-dimensional display apparatus 1. Light beams emitted by five sub-pixels SPix pertaining to a specific sub-pixel set PG pass through an opening/closing section 12 and propagate forward to the observer with luminance distributions DPR, DPI and DPL shown in the figure. By the same token, light beams emitted by sub-pixels SPix pertaining to other sub-pixel sets PG adjacent to the specific sub-pixel set PG also pass through the opening/closing section 12 and propagate forward to the observer with luminance distributions DPL2 and DPR2 shown in FIG. 14. The luminance distribution DPL2 is generated as a luminance distribution which is adjacent to the luminance distribution DPR and provided with an observation angle BR2 serving as a border with the luminance distribution DPR. By the same token, the luminance distribution DPR2 is generated as a luminance distribution which is adjacent to the luminance distribution DPL and provided with an observation angle BL2 serving as a border with the luminance distribution DPL.

The luminance distributions DPL2 and DPR2 are luminance distributions of light which should not be seen by the observer. That is to say, it is desirable that, as described before, the observer observes mainly the luminance distribution DPL of the left-eye image FL by making use of the left eye and observes mainly the luminance distribution DPR of the right-eye image FR by making use of the right eye. Thus, when the relation between the relative positions of the observer and the three-dimensional display apparatus 1 changes much so that, for example, the observer observes the luminance distribution DPR2 of the right-eye image FR by making use of the left eye or observes mainly the luminance distribution DPL2 of the left-eye image FL by making use of the right eye, the observer feels deterioration of the quality of the image.

In order to solve such a problem, it is possible to design a configuration in which the observation angle α of the left eye of the observer is set as an observation angel on the inner side of the observation angle CL whereas the observation angle α of the right eye of the observer is set as an observation angel on the inner side of the observation angle CR. In this way, the deterioration of the quality of the image can be reduced. To put it concretely, as shown in FIG. 14, for example, the observation angle α of the left eye of the observer is set as an observation angel CL2 in the vicinity of the center of the luminance distribution of the sub-pixel information P2. By the same token, the observation angle α of the right eye of the observer is set as an observation angle CR2 in the vicinity of the center of the luminance distribution of the sub-pixel information P4.

In the three-dimensional display apparatus 1, two pieces of sub-pixel information (that is, the sub-pixel information P1 and the sub-pixel information P2) form the left-eye pixel information PL whereas two pieces of sub-pixel information (that is, the sub-pixel information P4 and the sub-pixel information P5) form the right-eye pixel information PR. Thus, the widths of the luminance distributions DPL and DPR can be made large. As a result, it is possible to lessen the fear that the observer feels the deterioration of the quality of the image. That is to say, even when the relation between the relative positions of the observer and the three-dimensional display apparatus 1 changes much so that the observation angle α of the left eye of the observer is shifted from the observation angle CL2 in the direction toward the luminance distribution DPR2, the observer does not feel the deterioration of the quality of the image provided that the observation angle α of the left eye is still in a range ML from the observation angle CL2 to the observation angle BL2. By the same token, even when the relation between the relative positions of the observer and the three-dimensional display apparatus 1 changes much so that the observation angle α of the right eye of the observer is shifted from the observation angle CR2 in the direction toward the luminance distribution DPL2, the observer does not feel the deterioration of the quality of the image provided that the observation angle α of the right eye is still in a range MR from the observation angle CR2 to the observation angle BR2.

As described above, in the three-dimensional display apparatus 1, two pieces of sub-pixel information (that is, the sub-pixel information P1 and the sub-pixel information P2) form the left-eye pixel info/nation PL whereas two pieces of sub-pixel information (that is, the sub-pixel information P4 and the sub-pixel information P5) form the right-eye pixel information PR. Thus, the widths of the luminance distributions DPL and DPR can be made large in comparison with a configuration in which one piece of sub-pixel information composes the left-eye pixel information PL or the right-eye pixel information PR. As a result, it is possible to further increase the range of the observation angle α at which a desired image can be observed.

Next, the following description explains effects of the embodiment by comparing the embodiment with some typical comparison apparatus.

(First Typical Comparison Apparatus)

First of all, a three-dimensional display apparatus 1R serving as a first typical comparison apparatus is explained. The first typical comparison apparatus 1R is configured to display no interpolated image FI.

Figure 15:
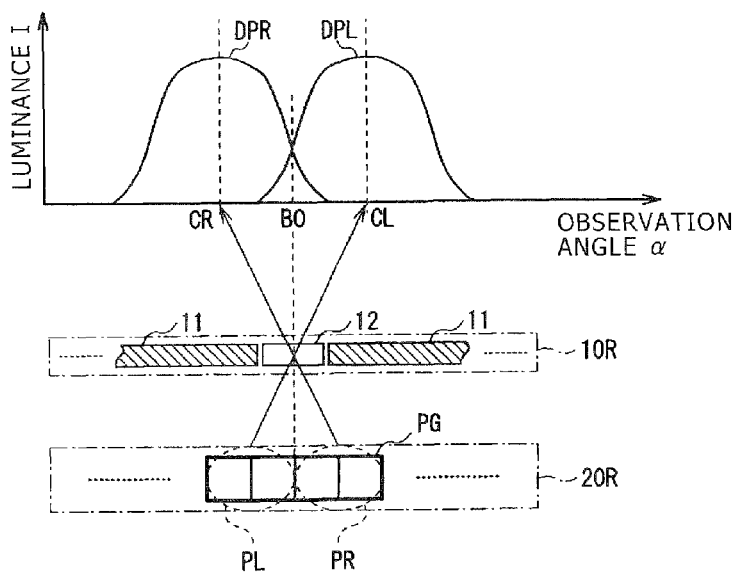
FIG. 15 is a model diagram showing a typical operation carried out by a three-dimensional display apparatus serving as typical comparison apparatus.

FIG. 15 is a model diagram showing light beams emitted by a sub-pixel set PG employed in the three-dimensional display apparatus 1R serving as the first typical comparison apparatus. In the three-dimensional display apparatus 1R, the sub-pixel set PG includes four adjacent sub-pixels SPix. The sub-pixel set PG displays left-eye pixel information PL and right-eye pixel information PR. The left-eye pixel information PL is two pieces of sub-pixel information for the left-eye image FL whereas the right-eye pixel information PR is two pieces of sub-pixel information for the right-eye image FR. That is to say, unlike the embodiment described so far, the three-dimensional display apparatus 1R serving as the first typical comparison apparatus does not display the interpolated pixel information PI for the interpolated image FI. It is to be noted that, as shown in none of the figures, the three-dimensional display apparatus 1R serving as the first typical comparison apparatus is provided with an opening/closing section 12 in the barrier section 10R for every sub-pixel set PG including four sub-pixels SPix adjacent in the horizontal direction X.

Light emitted by a sub-pixel SPix has a luminance distribution like ones shown in FIG. 15 at an observation angle α corresponding to the direction of the propagation of the light. To put it concretely, the left-eye pixel information PL exhibits a luminance distribution DPL having a center at an observation angle CL corresponding to the direction of the propagation of the left-eye pixel information PL whereas the right-eye pixel information PR exhibits a luminance distribution DPR having a center at an observation angle CR corresponding to the direction of the propagation of the right-eye pixel information PR. The luminance distribution DPL and the luminance distribution DPR are adjacent to each other, having an observation angle B0 serving as a border between the luminance distribution DPL and the luminance distribution DPR. When the relation between the relative positions of the observer and the three-dimensional display apparatus 1R changes much, for example, the observer observes also light for the luminance distribution DPR in addition to light for the luminance distribution DPL by making use of the left eye. In another case, when the relation between the relative positions of the observer and the three-dimensional display apparatus 1R changes much, the observer observes also light for the luminance distribution DPL in addition to light for the luminance distribution DPR by making use of the right eye. In the case of the typical configuration shown in FIG. 15 for example, when the observer observes the image at the observation angle B0, the crosstalk CT has an amount of 100%. At that time, the observer observes the left-eye image FL and the right-eye image FR, which has a disparity from the left-eye image FL, as a double image.

Figure 16:
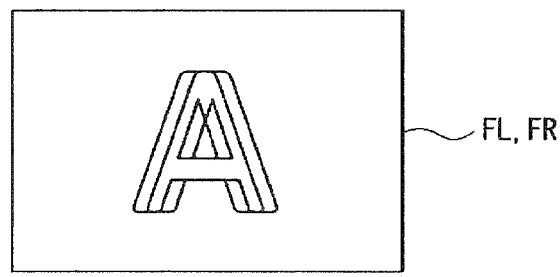
FIG. 16 is an explanatory diagram showing a typical display screen of the three-dimensional display apparatus shown in FIG. 15 to serve as a typical comparison apparatus.

FIG. 16 is an explanatory diagram showing a typical display screen of the three-dimensional display apparatus 1R serving as a first typical comparison apparatus for a case in which the observer observes the images at the observation angle B0. In this way, when the observer observes the images at the observation angle B0, the left-eye image FL has a large disparity from the right-eye image FR. Thus, the observer observes the double image including the left-eye image FL and the right-eye image FR which are shifted much from each other. As such, for a large disparity, the crosstalk acceptable amount decreases substantially as shown in FIG. 13 so that the observer easily feels the image-quality deterioration caused by crosstalk.

In the case of the three-dimensional display apparatus 1 according to the embodiment, on the other hand, interpolated pixel information PI is displayed between left-eye pixel information PL and right-eye pixel information PR. Thus, the left-eye pixel information PL and the right-eye pixel information PR can be displayed at positions separated from each other. It is therefore possible to make crosstalk difficult to generate between the left-eye image FL and the right-eye image FR having a large disparity from the left-eye image FL. In addition, the disparity between the left-eye image FL and the interpolated image FI as well as the disparity between the right-eye image FR and the interpolated image FI can be made small in comparison with the disparity between the left-eye image FL and the right-eye image FR. Thus, as shown in FIG. 13, the crosstalk acceptable amount can be increased. As a result, it is possible to reduce the image-quality deterioration caused by crosstalk and eventually felt by the observer.

In other words, the three-dimensional display apparatus 1 according to the embodiment makes use of the interpolated image FI as a buffer image so that it is possible to reduce the image-quality deterioration caused by crosstalk and eventually felt by the observer. That is to say, in the three-dimensional display apparatus 1R serving as the first typical comparison apparatus, as shown in FIG. 15, as the observation angle α changes, the image observed by the observer changes between the left-eye image FL and the right-eye image FR which are separated from each other by a border existing in the vicinity of the observation angle B0. In the figure, the left-eye image FL and the right-eye image FR are shown as the luminance distribution DPL and the luminance distribution DPR respectively. In other words, the disparity between the displayed images changes much in the vicinity of the observation angle B0.

In the case of the three-dimensional display apparatus 1 according to the embodiment, on the other hand, as shown in FIG. 10, as the observation angle changes, the image observed by the observer changes between the left-eye image FL and the interpolated image FI which are separated from each other by a border existing in the vicinity of the observation angle BL or between the interpolated image FI and the right-eye image FR which are separated from each other by a border existing in the vicinity of the observation angle BR. In FIG. 10, the left-eye image FL, the interpolated image FI and the right-eye image FR are shown as the luminance distribution DPL, the luminance distribution DPI and the luminance distribution DPR respectively. That is to say, in the case of the three-dimensional display apparatus 1 according to the embodiment, the first half of the disparity between the displayed images occurs at a stage in the vicinity of the observation angle BL whereas the second half of the disparity between the displayed images occurs at another stage in the vicinity of the observation angle BR. As described above, the three-dimensional display apparatus 1 displays the interpolated image FI along with the left-eye image FL and the right-eye image FR having a large disparity from the left-eye image FL. Thus, the large disparity can be relieved and it is possible to reduce the image-quality deterioration caused by crosstalk and eventually felt by the observer.

(Second Typical Comparison Apparatus)

Next, a three-dimensional display apparatus 1S serving as a second typical comparison apparatus is explained. The second typical comparison apparatus 1S is configured to display also an interpolated image FI.

Figure 17:
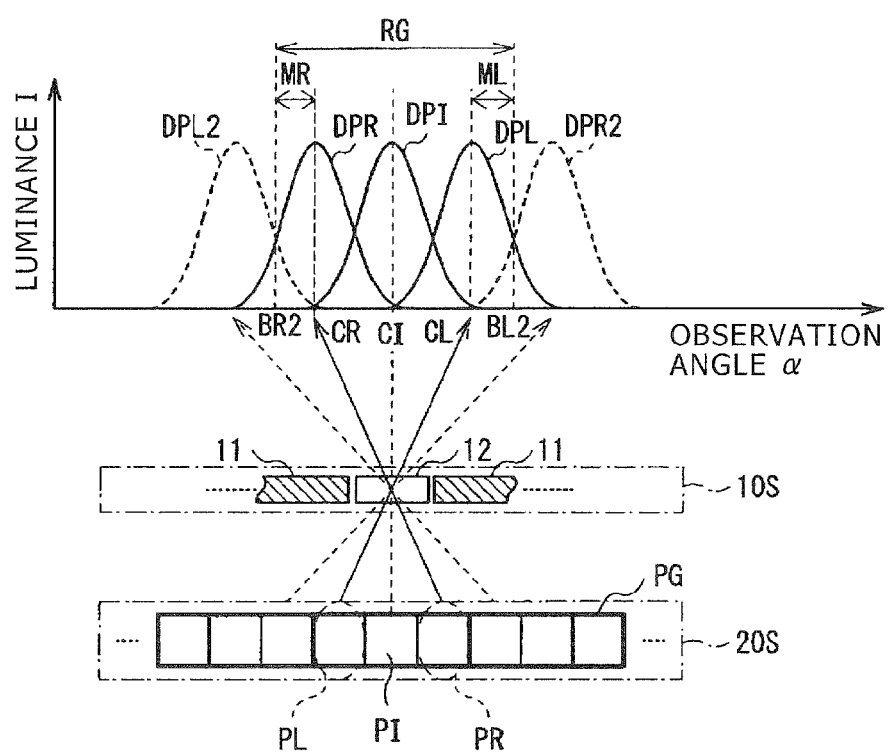
FIG. 17 is a model diagram showing a typical operation carried out by a three-dimensional display apparatus serving as another typical comparison apparatus.

FIG. 17 is a model diagram showing light beams emitted by a sub-pixel set PG employed in the three-dimensional display apparatus 1S serving as the second typical comparison apparatus. In the three-dimensional display apparatus 1S, the sub-pixel set PG includes three adjacent sub-pixels SPix. The sub-pixel set PG displays left-eye pixel information PL, interpolated pixel information PI and right-eye pixel information PR. The left-eye pixel information PL is sub-pixel information for the left-eye image FL whereas the right-eye pixel information PR is sub-pixel information for the right-eye image FR. On the other hand, the interpolated pixel information PI is sub-pixel information for the interpolated image FI. That is to say, unlike the embodiment described so far, in the three-dimensional display apparatus 1S serving as the second typical comparison apparatus, one piece of sub-pixel information composes the left-eye pixel information PL or the right-eye pixel information PR. It is to be noted that, as shown in none of the figures, the three-dimensional display apparatus 1S serving as the second typical comparison apparatus is provided with an opening/closing section 12 in the barrier section 10S for every sub-pixel set PG including three sub-pixels SPix adjacent in the horizontal direction X.

Light emitted by a sub-pixel SPix has a luminance distribution like ones shown in FIG. 17 at an observation angle α corresponding to the direction of the propagation of the light. To put it concretely, the left-eye pixel information PL exhibits a luminance distribution DPL having a center at an observation angle CL corresponding to the direction of the propagation of the left-eye pixel information PL whereas the right-eye pixel information PR exhibits a luminance distribution DPR having a center at an observation angle CR corresponding to the direction of the propagation of the right-eye pixel information PR. On the other hand, the interpolated pixel information PI exhibits a luminance distribution DPI having a center at an observation angle CI corresponding to the direction of the propagation of the interpolated pixel information PI. In addition, there is a sub-pixel set PG adjacent to the aforementioned sub-pixel set PG including three adjacent sub-pixels SPix. Light emitted by each sub-pixel SPix of the adjacent sub-pixel set PG also passes through the same opening/closing section 12 and propagates forward to the observer, creating luminance distributions DPL2 and DPR2 as shown in FIG. 17.

In the case of the three-dimensional display apparatus 1S serving as the second typical comparison apparatus, one piece of sub-pixel information composes the left-eye pixel information PL whereas one piece of sub-pixel information composes the right-eye pixel information PR. Thus, the widths of the luminance distributions DPL and DPR are small. Accordingly, when the relation between the relative positions of the three-dimensional display apparatus 1S and the observer changes much so that the observation angle α of the left eye is shifted from the observation angle CL in a direction toward the luminance distribution DPR2, it inevitably becomes easier for the observer to observe the right-eye image FR by making use of the left eye because the range ML is narrow. By the same token, when the relation between the relative positions of the three-dimensional display apparatus 1S and the observer changes much so that the observation angle α of the right eye is shifted from the observation angle CR in a direction toward the luminance distribution DPL2, it inevitably becomes easier for the observer to observe the left-eye image FL by making use of the right eye because the range MR is narrow.

In the case of the three-dimensional display apparatus 1 according to the embodiment, on the other hand, two pieces of sub-pixel information compose the left-eye pixel information PL and two pieces of sub-pixel information compose the right-eye pixel information PR. Thus, the widths of the luminance distributions DPL and DPL can be made large. As a result, it is possible to further increase the range of the observation angle α at which a desired image can be observed. To put it concretely, in the three-dimensional display apparatus 1 shown in FIG. 14 to serve as the three-dimensional display apparatus 1 according to the embodiment, each of the ranges ML and MR can be made about three times those of the three-dimensional display apparatus 1S shown in FIG. 17 to serve as the second typical comparison apparatus. Thus, in the case of the three-dimensional display apparatus 1, it is possible to lessen the fear that the right-eye image FR is observed by making use of the left eye whereas the left-eye image FL is observed by making use of the right eye.

Effects of the First Embodiment

As described above, in this embodiment, each sub-pixel set displays interpolated pixel information between left-eye pixel information and right-eye pixel information. Thus, the disparity between the left-eye image and the interpolated image as well as the disparity between the right-eye image and the interpolated image can be made small in comparison with the disparity between the left-eye image and the right-eye image. As a result, it is possible to reduce the image-quality deterioration caused by crosstalk and eventually felt by the observer.

In addition, in this embodiment, each sub-pixel set displays left-eye pixel information and right-eye pixel information which are separated from each other. Thus, crosstalk is hardly generated between the left-eye image and the right-eye image.

On top of that, in this embodiment, two pieces of sub-pixel information compose left-eye pixel information whereas two other pieces of sub-pixel information compose right-eye pixel information. Thus, it is possible to further increase the range of the observation angle at which a desired image can be observed.

Modified Version 1-1

Modified version 1-1 described below is a first modified version of the first embodiment.

Figure 18:
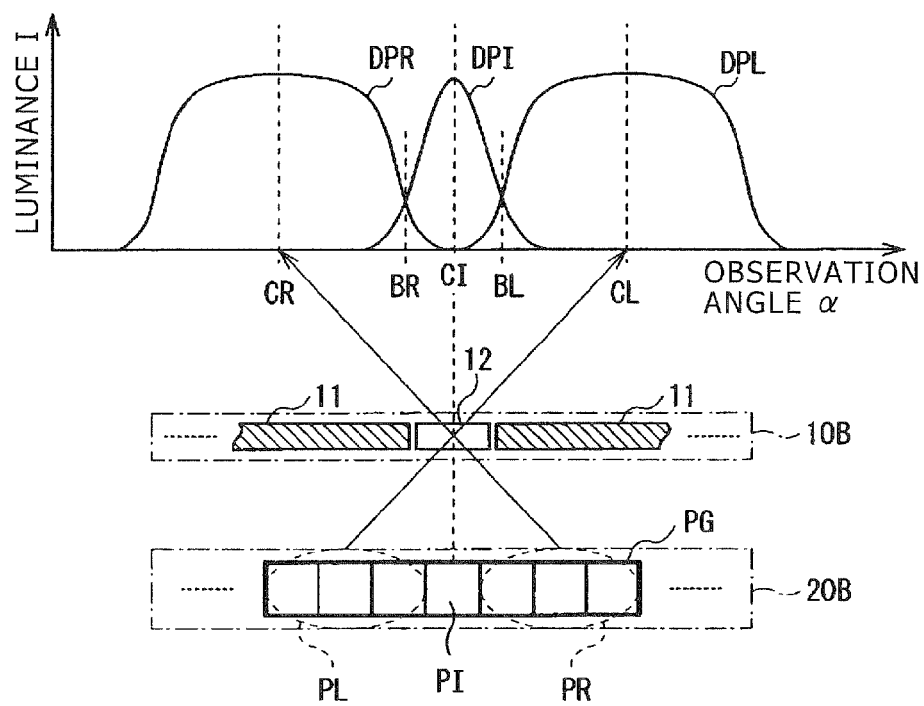
FIG. 18 is a model diagram showing a typical operation carried out by a three-dimensional display apparatus according to a modified version of the first embodiment.

As described above, in this embodiment, two pieces of sub-pixel information compose left-eye pixel information whereas two other pieces of sub-pixel information compose right-eye pixel information. However, implementations of the three-dimensional display apparatus are by no means limited to such a configuration. For example, pixel information can also be composed of three or more pieces of sub-pixel information. FIG. 18 is a model diagram showing a typical configuration adopted by a three-dimensional display apparatus according to the first modified version of the first embodiment. In this configuration, three pieces of sub-pixel information compose left-eye pixel information whereas three other pieces of sub-pixel information compose right-eye pixel information. A sub-pixel set PG according to this first modified version of the first embodiment is configured to include seven adjacent sub-pixels SPix. The sub-pixel set PG displays left-eye pixel information PL, interpolated pixel information PI and right-eye pixel information PR. The left-eye pixel information PL is three pieces of sub-pixel information for the left-eye image FL whereas the right-eye pixel information PR is three other pieces of sub-pixel information for the right-eye image FR. On the other hand, the interpolated pixel information PI is one piece of sub-pixel information for the interpolated image FI. It is to be noted that, as shown in none of the figures, the first modified version of the first embodiment is provided with an opening/closing section 12 in the barrier section 10B for every sub-pixel set PG including seven sub-pixels SPix adjacent in the horizontal direction X. Thus, the widths of the luminance distributions DPL and DPL can be made large. As a result, it is possible to further increase the range of the observation angle α at which a desired image can be observed.

Modified Version 1-2

Modified version 1-2 described below is a second modified version of the first embodiment.

In the embodiment, the interpolated-image generation section 41 generates one interpolated image FI. However, implementations of the three-dimensional display apparatus are by no means limited to such a configuration. For example, in place of this configuration, the interpolated-image generation section may also generate two or more interpolated images having disparities different from each other. The following description explains details of modified version 1-2 in which the interpolated-image generation section generates two interpolated images FIL and FIR whereas the sub-pixel set PG displays two pieces of interpolated pixel information PIL and PIR for the two interpolated images FIL and FIR respectively.

Figure 19A:
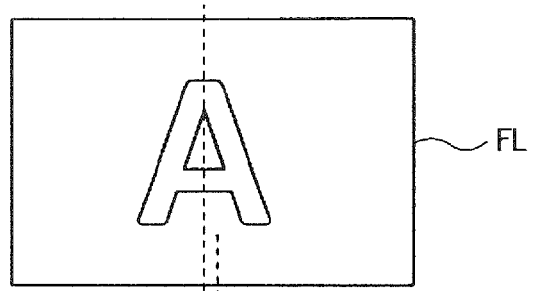
FIGS. 19A to 19D are a plurality of explanatory diagrams each showing a typical display screen of the three-dimensional display apparatus shown in FIG. 18.
Figure 19B:
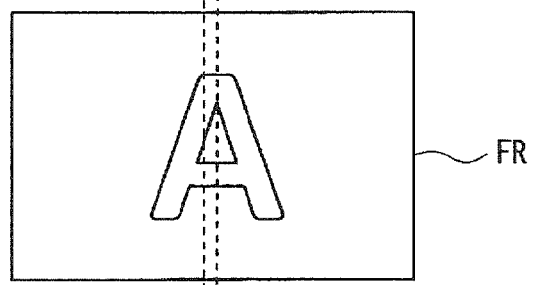
Figure 19C:
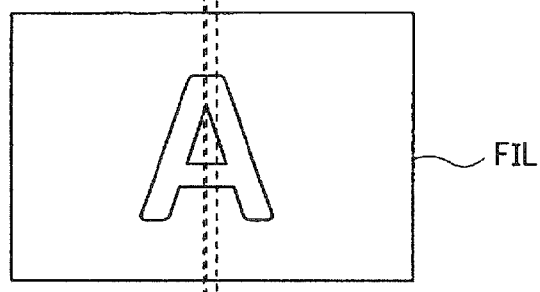
Figure 19D:
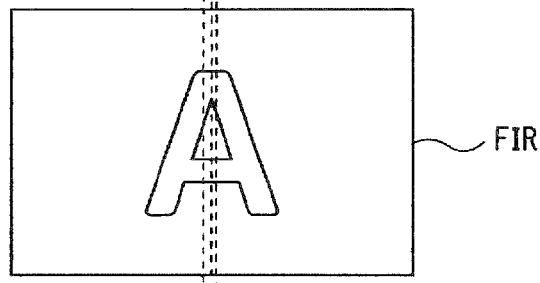

FIGS. 19A to 19D are a plurality of explanatory model diagrams each showing a typical image generated by an interpolated-image generation section 41C employed in a three-dimensional display apparatus 10 according to the second modified version of the first embodiment. To be more specific, FIG. 19A shows a left-eye image FL whereas FIG. 19B shows a right-eye image FR. On the other hand, FIG. 19C shows an interpolated image FIL whereas FIG. 19D shows an interpolated image FIR. On the basis of the left-eye image FL and the right-eye image FR, the interpolated-image generation section 41C carries out interpolated-image processing in order to generate the interpolated image FIL shown in FIG. 19C and the interpolated image FIR shown in FIG. 19D. The interpolated image FIL is an interpolated image at a first observing point between the observing points of the left-eye image FL and the right-eye image FR whereas the interpolated image FIR is an interpolated image at a second observing point between the observing points of the left-eye image FL and the right-eye image FR. In this typical example, the disparity between the left-eye image FL and the interpolated image FIL, the disparity between the interpolated image FIL and the interpolated image FIR as well as the disparity between the interpolated image FIR and the right-eye image FR are made equal to each other. That is to say, the interpolated-image generation section 41C divides the distance between the observing points of the left-eye image FL and the right-eye image FR into three equal segments in order to determine the locations of the first and second observing points at which the interpolated image FIL and the interpolated image FIR are generated respectively.

Figure 20:
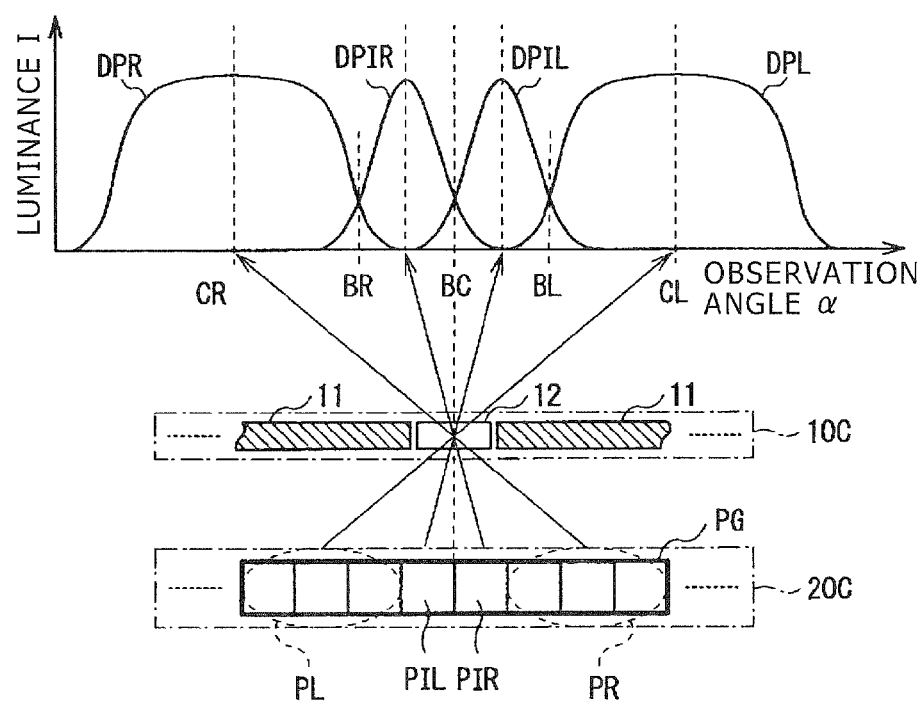
FIG. 20 is a model diagram showing a typical operation carried out by a three-dimensional display apparatus according to another modified version of the first embodiment.

FIG. 20 is a model diagram showing typical light beams emitted by the sub-pixel set PG employed in the three-dimensional display apparatus 10 according to the second modified version of the first embodiment. In this typical example, the sub-pixel set PG is configured to include eight adjacent sub-pixels SPix. The sub-pixel set PG displays left-eye pixel information PL, interpolated pixel information PIL, interpolated pixel information PIR and right-eye pixel information PR. The left-eye pixel information PL is three pieces of sub-pixel information for the left-eye image FL whereas the right-eye pixel information PR is three other pieces of sub-pixel information for the right-eye image FR. On the other hand, the interpolated pixel information PIL is one piece of sub-pixel information for the interpolated image FIL whereas the interpolated pixel information PIR is one piece of sub-pixel information for the interpolated image FIR. It is to be noted that, as shown in none of the figures, the second modified version of the first embodiment is provided with an opening/closing section 12 in the barrier section 100 for every sub-pixel set PG including eight sub-pixels SPix adjacent in the horizontal direction X.

Light emitted by a sub-pixel SPix has a luminance distribution like ones shown in FIG. 20 at an observation angle α corresponding to the direction of the propagation of the light. To put it concretely, the left-eye pixel information PL exhibits a luminance distribution DPL having a center at an observation angle CL corresponding to the direction of the propagation of the left-eye pixel information PL whereas the right-eye pixel information PR exhibits a luminance distribution DPR having a center at an observation angle CR corresponding to the direction of the propagation of the right-eye pixel information PR. On the other hand, the interpolated pixel information PIL exhibits a luminance distribution DPIL having a center at an observation angle corresponding to the direction of the propagation of the interpolated pixel information PIL whereas the interpolated pixel information PIR exhibits a luminance distribution DPIR having a center at an observation angle corresponding to the direction of the propagation of the interpolated pixel information PIR. The luminance distribution DPL and the luminance distribution DPIL are generated adjacently to each other and include an observation angle BL serving as the border between the luminance distribution DPL and the luminance distribution DPIL whereas the luminance distribution DPR and the luminance distribution DPIR are generated adjacently to each other and include the observation angle BR serving as the border between the luminance distribution DPR and the luminance distribution DPIR. On the other hand, the luminance distribution DPIL and the luminance distribution DPIR are generated adjacently to each other and include an observation angle BC serving as the border between the luminance distribution DPIL and the luminance distribution DPIR.

Figure 21A:
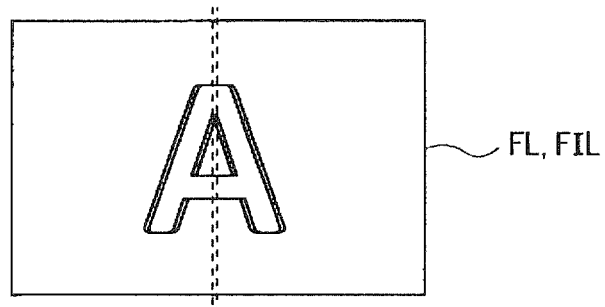
FIGS. 21A to 21C are a plurality of explanatory diagrams each showing a typical display screen of the three-dimensional display apparatus shown in FIG. 20.
Figure 21B:
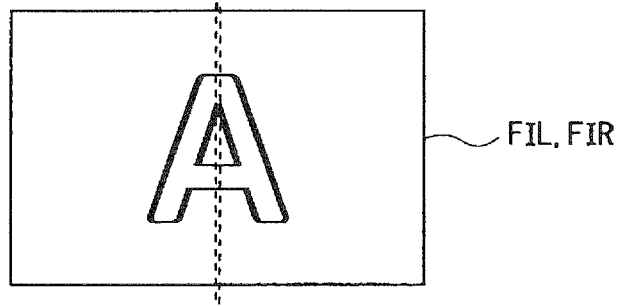
Figure 21C:
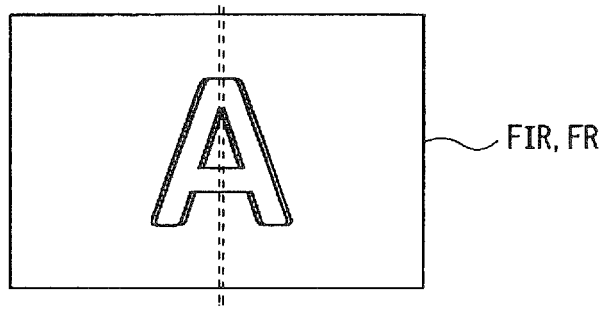

FIGS. 21A to 21C are a plurality of explanatory diagrams each showing a typical display screen including crosstalk. To be more specific, FIG. 21A shows a display screen seen at the observation angle BL whereas FIG. 21B shows a display screen seen at the observation angle BC. On the other hand, FIG. 21C shows a display screen seen at the observation angle BR. When the observer observes the display screen at the observation angle BL, the observer sees a double image including the left-eye image FL and the interpolated image FIL to appear like the one shown in FIG. 21A. When the observer observes the display screen at the observation angle BC, the observer sees a double image including the interpolated image FIL and the interpolated image FIR to appear like the one shown in FIG. 21B. When the observer observes the display screen at the observation angle BR, the observer sees a double image including the interpolated image FIR and the right-eye image FR to appear like the one shown in FIG. 21C. At that time, the disparity between the left-eye image FL and the interpolated image FIL, the disparity between the interpolated image FIR and the interpolated image FIL as well as the disparity between the interpolated image FIR and the right-eye image FR are equal to about one-third of the disparity between the left-eye image FL and the right-eye image FR. Thus, the three-dimensional display apparatus 10 is capable of reducing the image-quality deterioration caused by crosstalk and eventually felt by the observer.

Modified Version 1-3

Modified version 1-3 described below is a third modified version of the first embodiment.

Figure 22:
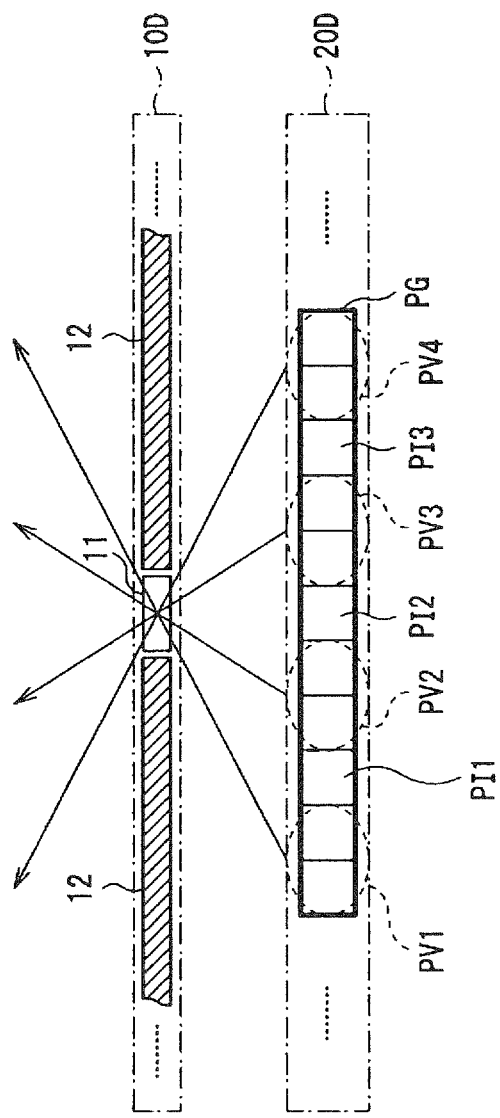
FIG. 22 is a model diagram showing a typical operation carried out by a three-dimensional display apparatus according to a further modified version of the first embodiment.

As described above, the three-dimensional display apparatus 1 according to the embodiment displays three observing-point images, that is, the left-eye image FL, the interpolated image FI and the right-eye image FR. However, implementations of the present disclosure are by no means limited to such a configuration. For example, in place of this configuration, the three-dimensional display apparatus may also display four or more observing-point images. FIG. 22 is a model diagram showing a typical configuration in which seven observing-point images are displayed as follows. In a three-dimensional display apparatus 1D according to this third modified version of the first embodiment, on the basis of a video-picture signal Sdisp including four observing-point images FV1, FV2, FV3 and FV4 not shown in the figure, an interpolated-image generation section 41D carries out interpolated-image generation processing. To put it concretely, the interpolated-image generation section 41D generates an interpolated image FI1 not shown in the figure on the basis of the observing-point images FV1 and FV2, generates an interpolated image FI2 not shown in the figure on the basis of the observing-point images FV2 and FV3 and generates an interpolated image FI3 not shown in the figure on the basis of the observing-point images FV3 and FV4. Then, each sub-pixel set PG composed of 11 adjacent sub-pixels SPix displays observing-point pixel information PV1 for the observing-point image FV1, interpolated pixel information PI1 for the interpolated image FI1, observing-point pixel information PV2 for the observing-point image FV2, interpolated pixel information PI2 for the interpolated image FI2, observing-point pixel information PV3 for the observing-point image FV3, interpolated pixel information PI3 for the interpolated image FI3 and observing-point pixel information PV4 for the observing-point image FV4. At that time, the sub-pixel set PG displays the interpolated pixel information PI1 between the observing-point pixel information PV1 and the observing-point pixel information PV2, displays the interpolated pixel information PI2 between the observing-point pixel information PV2 and the observing-point pixel information PV3 and displays the interpolated pixel information PI3 between the observing-point pixel information PV3 and the observing-point pixel information PV4. It is to be noted that, as shown in none of the figures, the three-dimensional display apparatus 1D according to this third modified version of the first embodiment is provided with an opening/closing section 12 in the barrier section 10D for every sub-pixel set PG including 11 sub-pixels SPix adjacent in the horizontal direction X.

Modified Version 1-4

Modified version 1-4 described below is a fourth modified version of the first embodiment.

In the embodiment described so far, a sub-pixel set PG is constructed by taking a sub-pixel SPix as a unit. However, implementations of the present disclosure are by no means limited to such a configuration. In place of this configuration, for example, a sub-pixel set PG can also be constructed by taking a pixel Pix as a unit. In this case, for example, a sub-pixel set PG is constructed from five pixels Pix and pieces of pixel information P1 to P5 of the five pixels Pix respectively are displayed as is the case with the configuration shown in FIG. 9.

Modified Version 1-5

Modified version 1-5 described below is a fifth modified version of the first embodiment.

The embodiment described so far employs an interpolated-image generation section 41 for generating an interpolated image FI on the basis of a left-eye image FL and a right-eye image FR. However, implementations of the present disclosure are by no means limited to such a configuration. In place of this configuration, it is also possible to adopt another configuration employing no interpolated-image generation section 41. In this case, for example, a video-picture signal including observing-point images of three observing points corresponding to a left-eye image FL, an interpolated image FI and a right-eye image FR respectively is supplied to the control section 42 from an external source.

2: Second Embodiment

Next, a three-dimensional display apparatus 2 according to a second embodiment of the present disclosure is explained. In this second embodiment, a sub-pixel set displays interpolated pixel information PI between left-eye pixel information PL and right-eye pixel information PR and also displays other pixel information on a side external to the left-eye pixel information PL as well as other pixel information on a side external to the right-eye pixel information PR. It is to be noted that each configuration portion employed in the three-dimensional display apparatus 2 according to the second embodiment as a configuration portion essentially identical with its counterpart configuration portion employed in the three-dimensional display apparatus 1 according to the first embodiment is denoted by the same reference numeral as the counterpart configuration portion and the explanation of the identical configuration portion is properly omitted.

Figure 23:
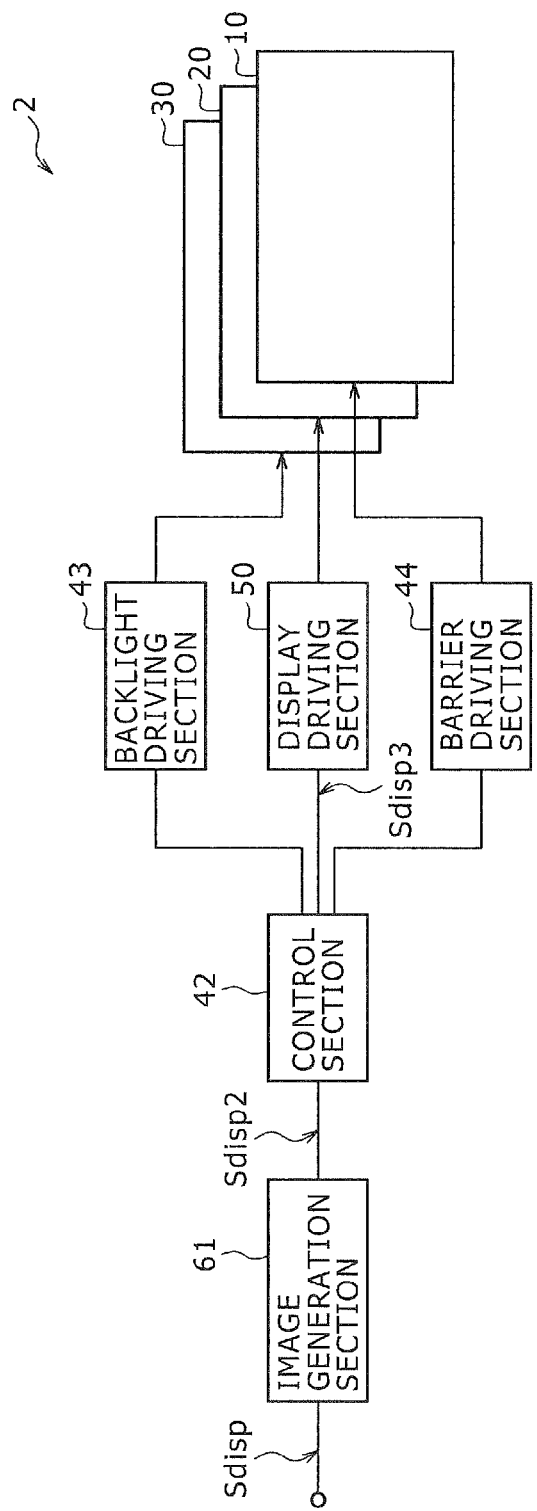
FIG. 23 is a block diagram showing a typical configuration of a three-dimensional display apparatus according to a second embodiment of the present disclosure.

FIG. 23 is a block diagram showing a typical configuration of the three-dimensional display apparatus 2 according to the second embodiment of the present disclosure. As shown in the figure, the three-dimensional display apparatus 2 employs an image generation section 61.

The image generation section 61 carries out image processing on the basis of a video-picture signal Sdisp supplied thereto from an external source in order to generate a video-picture signal Sdisp2. To put it concretely, in an operation carried out by the three-dimensional display apparatus 2 to show a three-dimensional display, on the basis of a left-eye image FL and a right-eye image FR which are included in the video-picture signal Sdisp, the image generation section 61 executes a function to perform interpolated-image processing in order to generate an interpolated image FI and a function to perform extrapolated-image processing in order to generate extrapolated images FEL and FER.

Figure 24A:
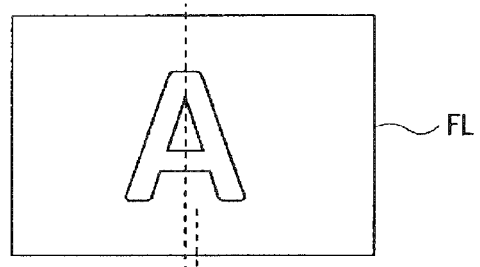
FIGS. 24A to 24D are a plurality of explanatory diagrams showing a typical operation carried out by an image generation section shown in FIG. 23.
Figure 24B:
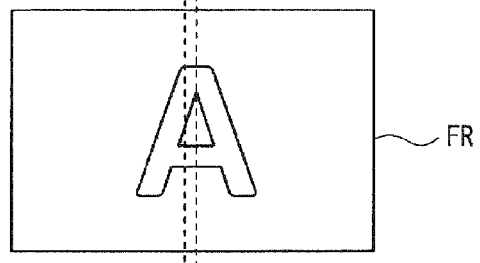
Figure 24C:
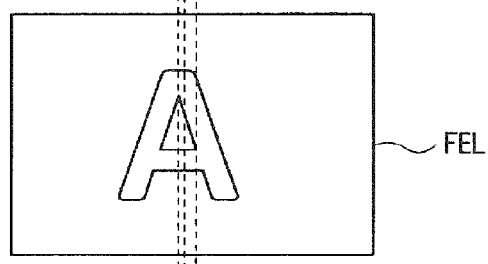
Figure 24D:
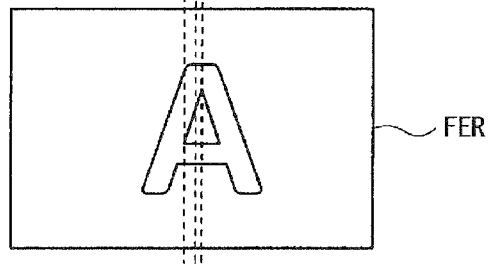

FIGS. 24A to 24D are a plurality of explanatory model diagrams each showing a typical image handled by the image generation section 61. To be more specific, FIG. 24A shows the left-eye image FL whereas FIG. 24B shows the right-eye image FR. On the other hand, FIG. 24C shows the extrapolated image FEL whereas FIG. 24D shows the extrapolated image FER. On the basis of the left-eye image FL and the right-eye image FR, the image generation section 61 generates the interpolated image FI shown in FIG. 2C in the same way as the first embodiment and also generates the extrapolated image FEL shown in FIG. 24C as well as the extrapolated image FER shown in FIG. 24D. The extrapolated image FEL is an observing-point image for an observing point on the left side of the left-eye image FL whereas the extrapolated image FER is an observing-point image for an observing point on the right side of the right-eye image FR.

Figure 25:
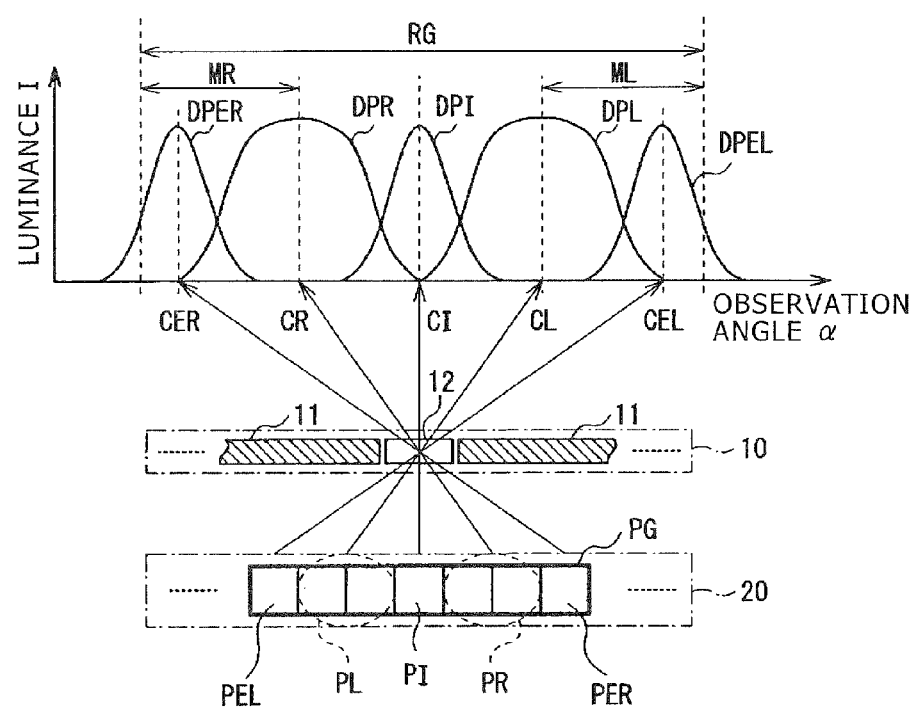
FIG. 25 is a model diagram showing a typical operation carried out by the three-dimensional display apparatus shown in FIG. 23.

FIG. 25 is a model diagram showing light emitted by a sub-pixel set PG of the three-dimensional display apparatus 2. A sub-pixel set PG of the three-dimensional display apparatus 2 is composed of seven adjacent sub-pixels SPix. The sub-pixel set PG displays extrapolated pixel information PEL, left-eye pixel information PL, interpolated pixel information PI, right-eye pixel information PR and extrapolated pixel information PER. The extrapolated pixel information PEL is one piece of sub-pixel information for the extrapolated image FEL whereas the left-eye pixel information PL is two pieces of sub-pixel information for the left-eye image FL. The interpolated pixel information PI is one piece of sub-pixel information for the interpolated image FI. The right-eye pixel information PR is two pieces of sub-pixel information for the right-eye image FR whereas the extrapolated pixel information PER is one piece of sub-pixel information for the extrapolated image FER. It is to be noted that, as shown in none of the figures, the three-dimensional display apparatus 2 according to the second embodiment is provided with an opening/closing section 12 in the barrier section 10 for every sub-pixel set PG including seven sub-pixels SPix adjacent in the horizontal direction X.

Light emitted by a sub-pixel SPix has a luminance distribution like ones shown in FIG. 25 at an observation angle $\alpha$ corresponding to the direction of the propagation of the light. To put it concretely, the extrapolated pixel information PEL exhibits a luminance distribution DPEL having a center at an observation angle CEL corresponding to the direction of the propagation of the extrapolated pixel information PEL. By the same token, the left-eye pixel information PL exhibits a luminance distribution DPL having a center at an observation angle CL corresponding to the direction of the propagation of the left-eye pixel information PL. In the same way, the interpolated pixel information PI exhibits a luminance distribution DPI having a center at an observation angle CI corresponding to the direction of the propagation of the interpolated pixel information PI. Likewise, the right-eye pixel information PR exhibits a luminance distribution DPR having a center at an observation angle CR corresponding to the direction of the propagation of the right-eye pixel information PR. Similarly, the extrapolated pixel information PER exhibits a luminance distribution DPER having a center at an observation angle CER corresponding to the direction of the propagation of the extrapolated pixel information PER.

In the three-dimensional display apparatus 2, the sub-pixel set PG displays the left-eye pixel information PL, the right-eye pixel information PR, the extrapolated pixel information PEL on the left side of the left-eye pixel information PL and the extrapolated pixel information PER on the right side of the right-eye pixel information PR. Thus, the ranges ML and MR can be increased. As a result, it is possible to lessen the fear that the observer feels the deterioration of the quality of the image. That is to say, even when the relation between the relative positions of the three-dimensional display apparatus 2 and the observer changes much so that the observation angle $\alpha$ of the left eye is shifted from the observation angle CL in an outward direction, the observer does not feel the deterioration of the quality of the image provided that the observation angle $\alpha$ of the left eye is still in the range ML. By the same token, even when the relation between the relative positions of the three-dimensional display apparatus 2 and the observer changes much so that the observation angle $\alpha$ of the right eye is shifted from the observation angle CR in an outward direction, the observer does not feel the deterioration of the quality of the image provided that the observation angle $\alpha$ of the right eye is still in the range MR.

In addition, as described above, the sub-pixel set PG employed in the three-dimensional display apparatus 2 displays the left-eye pixel information PL, the right-eye pixel information PR, the extrapolated pixel information PEL on the left side of the left-eye pixel information PL and the extrapolated pixel information PER on the right side of the right-eye pixel information PR. Thus, the observer can observe a more natural three-dimensional display. That is to say, with the relation between the relative positions of the three-dimensional display apparatus 2 and the observer changing much, when the observer observes the luminance distribution DPEL by making use of the left eye, the observer also sees the extrapolated image FEL for an observing point on the left side of the left-eye image FL. By the same token, with the relation between the relative positions of the three-dimensional display apparatus 2 and the observer changing much, when the observer observes the luminance distribution DPER by making use of the right eye, the observer also sees the extrapolated image FER for an observing point on the right side of the right-eye image FR. Thus, the observer can observe a three-dimensional display of more observing points.

As described above, in the second embodiment, every sub-pixel set PG also displays the extrapolated pixel information PEL on the left side of the left-eye pixel information PL and the extrapolated pixel information PER on the right side of the right-eye pixel information PR. Thus, it is possible to further increase the range of the observation angle $\alpha$ at which a desired image can be observed and observe a more natural three-dimensional display. The second embodiment also demonstrates the other effects exhibited by the first embodiment.

Modified Versions 2-1

Modified versions can each be obtained by modifying the second embodiment in the same way as the way to obtain each of the modified versions of the first embodiment.

3: Typical Applications

Next, the following description explains a typical application of the three-dimensional display apparatus according to the embodiments and the modified versions.

Figure 26:
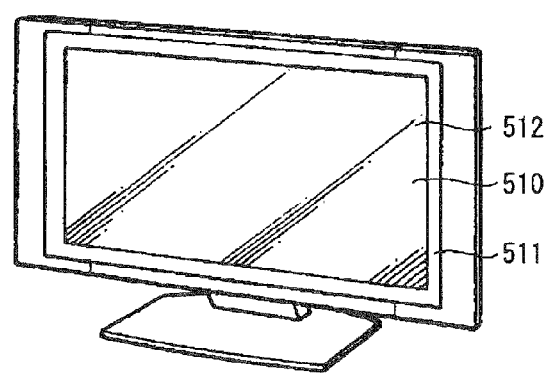
FIG. 26 is a perspective diagram showing an external configuration of a TV employing the three-dimensional display apparatus according to an embodiment of the present disclosure.

FIG. 26 is a perspective diagram showing an external configuration of a TV employing the three-dimensional display apparatus according to any one of the embodiments of the present disclosure. As shown in the figure, the TV has a video-picture display screen section 510 which includes a front panel 511 and a filter glass 512. The video-picture display screen section 510 is the three-dimensional display apparatus according to any one of the embodiments.

The three-dimensional display apparatus according to any one of the embodiments can be applied to not only such a TV, but also electronic devices in all fields. The electronic devices include a digital camera, a notebook personal computer, a portable terminal such as a hand phone, a portable game machine and a video camera. In other words, the three-dimensional display apparatus according to any one of the embodiments can be applied to any electronic device included in any field as a device for displaying a video picture.

4: Other Modified Versions

The descriptions given so far have explained some embodiments, modified versions of the embodiments and typical applications to electronic devices. However, implementations of the present disclosure are by no means limited to the three-dimensional display apparatus according to the embodiments and the modified versions of the embodiments. That is to say, any other three-dimensional display apparatus of the present disclosure can be obtained by further modifying the embodiments and the modified versions of the embodiments in a variety of ways.

Figure 27:
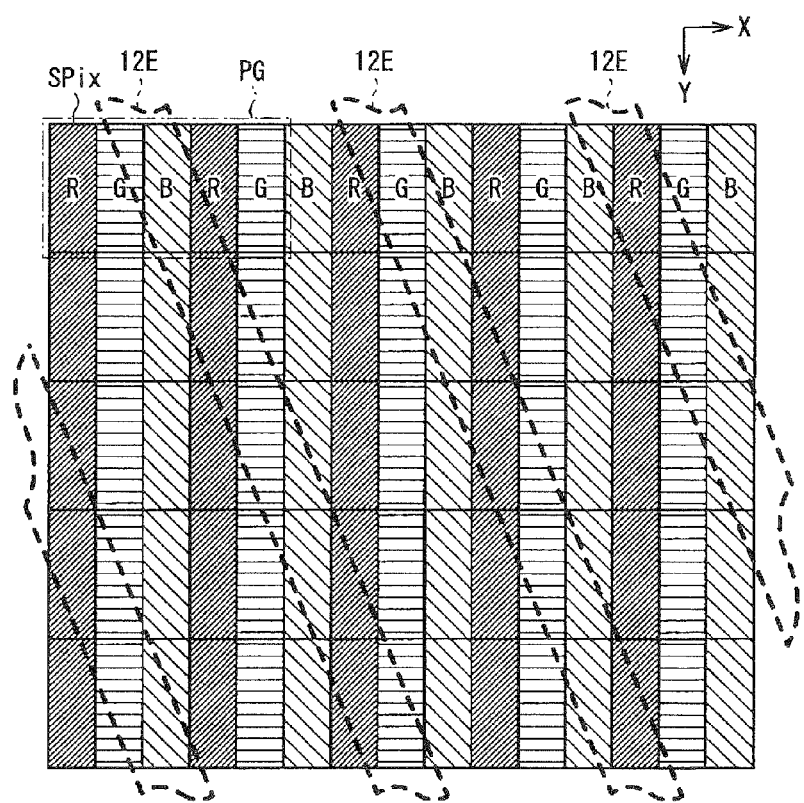
FIG. 27 is an explanatory diagram showing a relation between a display section and a barrier section which are employed in a three-dimensional display apparatus according to a modified version.
Figure 28:
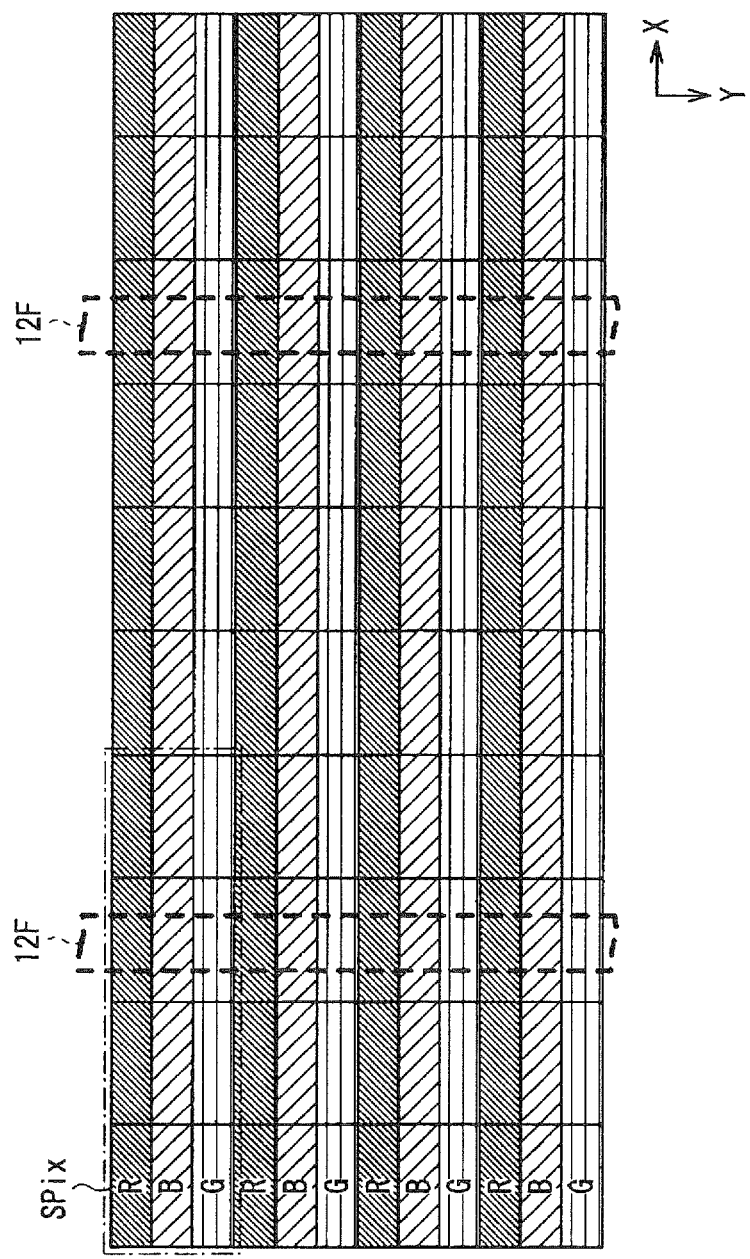
FIG. 28 is an explanatory diagram showing a relation between a display section and a barrier section which are employed in a three-dimensional display apparatus according to another modified version.

For example, in the embodiments described before and the modified versions of the embodiments, the opening/closing sections 11 and 12 included in the barrier section 10 each has the shape of the so-called step barrier. However, the shape of the opening/closing sections 11 and 12 is by no means limited to the shape of the step barrier. In place of the shape of the step barrier, for example, the opening/closing sections can also be extended in an inclined direction in a configuration like one shown in FIG. 27. As an alternative, the opening/closing sections can also be extended in the vertical direction Y in a configuration shown in FIG. 28. In the case of the configuration shown in FIG. 28, for example, each of the sub-pixels SPix can be configured to have a long rectangular shape oriented in the horizontal direction X.

In addition, for example, in the embodiments described before and the modified versions of the embodiments, during an operation to output a three-dimensional display, the opening/closing section 12 is always put in an open state. However, implementations of the present disclosure are by no means limited to this configuration. In place of this configuration, for example, it is possible to provide another configuration in which the opening/closing sections 12 are divided into a plurality of groups and, with the opening/closing sections 12 divided into a plurality of groups, opening and closing operations are carried out on the opening/closing sections 12 in group units on a time division basis. As an example, the opening/closing sections 12 are divided into two groups and opening and closing operations are carried out on opening/closing sections 12 in group units alternately. In this way, the resolution of the three-dimensional display apparatus can be doubled.

Figure 29:
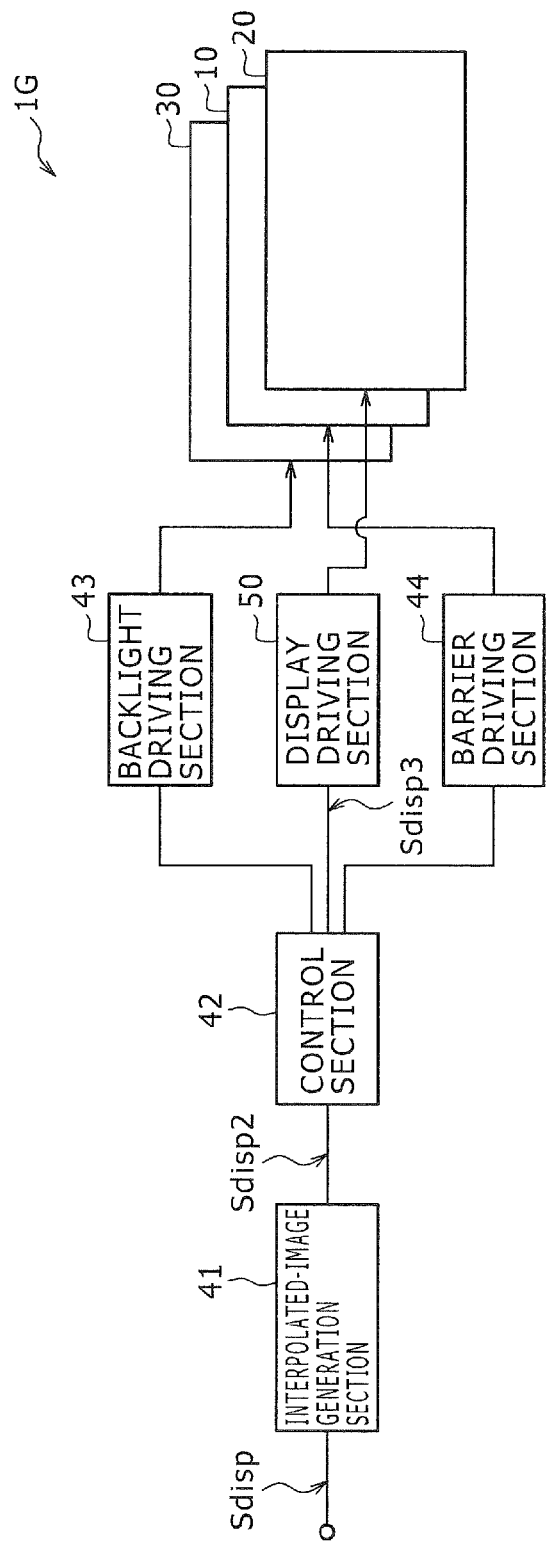
FIG. 29 is an explanatory diagram showing a typical configuration of a three-dimensional display apparatus according to a further modified version.

In addition, for example, in the embodiments described before and the modified versions of the embodiments, the backlight 30, the display section 20 and the barrier section 10 are arranged in the same order as the order in which the backlight 30, the display section 20 and the barrier section 10 are enumerated in this sentence. However, implementations of the present disclosure are by no means limited to this configuration. In place of this configuration, for example, it is also possible to provide another configuration wherein the backlight 30, the barrier section 10 and the display section 20 are arranged in the same order as the order in which the backlight 30, the barrier section 10 and the display section 20 are enumerated in this sentence as shown in FIG. 29.

FIG. 30 is a model diagram showing a typical operation carried out by the display section 20 and the barrier section 10 in this modified version. In this modified version, first of all, light emitted by the backlight 30 propagates to the barrier section 10. The light arriving at the barrier section 10 and passing through the opening/closing section 12 is then modulated by the display section 20 in order to display left-eye pixel information PL as a left-eye image FL, interpolated pixel information PI as an interpolated image FI and right-eye pixel information PR as a right-eye image FR.

In addition, for example, in the embodiments described before and the modified versions of the embodiments, the display section 20 and the backlight 30 are employed. However, implementations of the present disclosure are by no means limited to this configuration. In place of this configuration, for example, it is also possible to provide another configuration in which an EL (Electro Luminescence) display section or the like is used.

In addition, for example, in the embodiments described before and the modified versions of the embodiments, the barrier section 10 is configured to make use of the opening/closing sections 11 and 12 capable of changing the transmission factor of the light. However, implementations of the present disclosure are by no means limited to this configuration. In place of this configuration, for example, it is also possible to provide another configuration in which the barrier section is configured to make use of a solid-state barrier. Typically, the solid-state barrier blocks light of a portion corresponding to the opening/closing section 11 but puts a portion corresponding to the opening/closing section 12 in an open state of transmitting light. In an operation to output a three-dimensional display, also in the case of this other configuration, it is possible to carry out the same operation as the embodiment shown in FIG. 9 or the like. In addition, in an operation to output a two-dimensional display as an ordinary display, for example, a sub-pixel set PG is capable of displaying one piece of pixel information in order to show the two-dimensional display. Typically, the sub-pixel set PG includes five sub-pixels SPix provided in the vicinity of the opening section.

In addition, for example, in the embodiments described before and the modified versions of the embodiments, a three-dimensional display apparatus adopting the parallax barrier method is implemented. However, implementations of the present disclosure are by no means limited to this configuration. In place of this configuration, for example, it is also possible to configure a three-dimensional display apparatus adopting the lenticular-lens method. Details of such a three-dimensional display apparatus are described as follows.

FIG. 31 is a model diagram showing a typical operation carried out by a three-dimensional display apparatus 9, which adopts the lenticular-lens method, in order to output a three-dimensional display. The three-dimensional display apparatus 9 is provided with a lens section 90 having a plurality of lenses 99 for refracting light emitted by the backlight 30 and transmitted by the display section 20. In an operation to output a three-dimensional display, the sub-pixel set PG employed at a portion of the display section 20 displays left-eye pixel information PL as a left-eye image FL, interpolated pixel information PI as an interpolated image FI and right-eye pixel information PR as a right-eye image FR. Typically, the sub-pixel set PG includes five sub-pixels SPix provided at the aforementioned portion facing the lenses 99. Then, light beams emitted by the sub-pixels SPix provided in the display section 20 are refracted by the lenses 99 to propagate in respective directions.

It is to be noted that the lenses 99 can each be a lens created to have a constant refraction index or configured to have variable characteristics such as the refraction index. Typical examples of the lens configured to have variable characteristics are a liquid-crystal lens and a liquid lens.

It is to be noted that the present disclosure can also be configured into configurations described as follows.

(1) A display apparatus including:
a display section; and
a light-beam control section configured to control a light beam coming from the display section or a light beam propagating to the display section;
the display apparatus having a first display mode for displaying a plurality of observing-point images on the display section wherein
the observing-point images include
two or more first observing-point images, and
one or a plurality of second observing-point images, and
the number of pixels included in each of the second observing-point images is smaller than the number of pixels included in each of the first observing-point images.

(2) The display apparatus according to implementation (1) wherein:
each of the first observing-point images is displayed by making use of a first pixel group including a plurality of pixels;
each of the second observing-point images is displayed by making use of a second pixel group including pixels;
the number of pixels included in the second pixel group is smaller than the number of pixels included in the first pixel group; and
two or more the first pixel groups used for displaying the two or more first observing-point images and one or a plurality of the second pixel groups used for displaying the one or a plurality of second observing-point images form a basic pixel set.

(3) The display apparatus according to implementation (2) wherein the second pixel group is interpolated between the first pixel groups in the basic pixel set.

(4) The display apparatus according to implementation (3) wherein every pixel in the second pixel group is an interpolated pixel generated as a result of interpolation processing carried out on pixels in the first pixel groups.

(5) The display apparatus according to implementation (4) wherein the two or more first observing-point images are left-eye and right-eye images whereas the second observing-point images are one or a plurality of interpolation images between the left-eye and right-eye image.

(6) The display apparatus according to implementation (2) wherein, at the outermost edge position of the basic pixel set, a pixel of the second pixel group is extrapolated.

(7) The display apparatus according to implementation (4) wherein the extrapolated pixel is a pixel of an observing-point image taking the outermost edge position as an observing point.

(8) The display apparatus according to implementation (2) wherein, in the basic pixel set, an interpolated pixel group pertaining to the second pixel group is interpolated between the first pixel groups and, at the outermost edge position of the basic pixel set, an extrapolation pixel group pertaining to the second pixel group is extrapolated.

(9) The display apparatus according to any one of implementations (2) to (8) wherein:
the light-beam control section is a barrier section configured to transmit or block light;
the barrier section includes
a plurality of first group liquid-crystal barriers, and
a plurality of second group liquid-crystal barriers; and
the states of the first group liquid-crystal barriers and the second group liquid-crystal barriers can be switched from an open state of transmitting light to a closed state of blocking light or vice versa.

(10) The display apparatus according to implementation (9) wherein:
the plurality of first group liquid-crystal barriers are put in the open state whereas the plurality of second group liquid-crystal barriers are put in the closed state; and
the basic pixel set is provided at a position facing the plurality of first group liquid-crystal barriers.

(11) The display apparatus according to any one of implementations (1) to (8) wherein the light-beam control section operates to control light beams coming from observing-point images displayed on the display section or light beams propagating to observing-point images displayed on the display section so as to guide the light beams in the respective angular directions of the light beams.

(12) The display apparatus according to any one of implementations (1) to (8) and (11), the display apparatus further having a second display mode wherein:
a single observing-point image is displayed on the display section; and
the light-beam control section operates to control light beams coming from the single observing-point image or light beams leading to the single observing-point image to propagate as they are.

(13) The display apparatus any one of implementations (1) to (8), (11) and (12) wherein:
the light-beam control section is a barrier section configured to transmit or block light; and
the barrier section has a plurality of fixed opening sections.

(14) The display apparatus according to any one of implementations (1) to (8), (11) and (12) wherein the light-beam control section has a plurality of variable-characteristic lenses, the refraction indexes of which can each be switched from one value to another.

(15) The display apparatus according to any one of implementations (1) to (8), (11) and (12) wherein the light-beam control section has a plurality of fixed-characteristic lenses.

(16) The display apparatus according to any one of implementations (1) to (15), the display apparatus further including:
a backlight; wherein
the display section is a liquid-crystal display section, and
the liquid-crystal display section is provided between the backlight and the light-beam control section.

(17) The display apparatus according to any one of implementations (1) to (15), the display apparatus further including:

a backlight; wherein
the display section is a liquid-crystal display section, and
the light-beam control section is provided between the backlight and the liquid-crystal display section.

(18) An electronic device including:

a display apparatus; and
a control section configured to control operations making use of the display apparatus; wherein
the display apparatus includes
a display section, and
a light-beam control section configured to control a light beam coming from the display section or a light beam propagating to the display section,
the display apparatus has a first display mode for displaying a plurality of observing-point images on the display section,
the observing-point images include two or more first observing-point images and one or a plurality of second observing-point images, and
the number of pixels included in each of the second observing-point images is smaller than the number of pixels included in each of the first observing-point images.

The present application contains subject matter related to that disclosed in Japanese Priority Patent Application JP 2011-221979 filed in the Japan Patent Office on Oct. 6, 2011, the entire content of which is hereby incorporated by reference.

What is claimed is:

1. A display apparatus comprising:
a display section; and
a light-beam control section configured to control a light beam coming from said display section or a light beam propagating to said display section;
said display apparatus having a first display mode for displaying a plurality of observing-point images on said display section wherein
said observing-point images include
two or more first observing-point images, and
one or a plurality of second observing-point images, and
the number of pixels included in each of said second observing-point images is smaller than the number of pixels included in each of said first observing-point images
each of said first observing-point images is displayed by making use of a first pixel group including a plurality of pixels;
each of said second observing-point images is displayed by making use of a second pixel group including pixels;
the number of pixels included in said second pixel group is smaller than the number of pixels included in said first pixel group; and
two or more said first pixel groups used for displaying said two or more first observing-point images and one or a plurality of said second pixel groups used for displaying said one or a plurality of second observing-point images form a basic pixel set;
in said basic pixel set, an interpolated pixel group pertaining to said second pixel group is interpolated between said first pixel groups;
each pixel of said interpolated pixel group is a pixel of an observing-point image for an intermediate observing point between observing points for said first observing-point images displayed by said first pixel groups interpolating said interpolated pixel group in said basic pixel set; and
said two or more first observing-point images and one or a plurality of said second pixel groups used for displaying said one or a plurality of second observing-point images form a basic pixel set.

2. The display apparatus according to claim 1 wherein, at the outermost edge position of said basic pixel set, a pixel of said second pixel group is extrapolated.

3. The display apparatus according to claim 1 wherein said extrapolated pixel is a pixel of an observing-point image taking said outermost edge position as an observing point.

4. The display apparatus according to claim 1, wherein
in said basic pixel set, an interpolated pixel group pertaining to said second pixel group is interpolated between said first pixel groups and, at said outermost edge position of said basic pixel set, an extrapolation pixel group pertaining to said second pixel group is extrapolated.

5. The display apparatus according to claim 1, wherein:
said light-beam control section is a barrier section configured to transmit or block light;
said barrier section comprises
a plurality of first group liquid-crystal barriers, and
a plurality of second group liquid-crystal barriers; and
the states of said first group liquid-crystal barriers and said second group liquid-crystal barriers can be switched from an open state of transmitting light to a closed state of blocking light or vice versa.

6. The display apparatus according to claim 5 wherein:
said plurality of first group liquid-crystal barriers are put in said open state of transmitting light whereas said plurality of second group liquid-crystal barriers are put in said closed state of blocking light; and
said basic pixel set is provided at a position facing said plurality of first group liquid-crystal barriers.

7. The display apparatus according to claim 1 wherein said light-beam control section operates to control light beams coming from observing-point images displayed on said display section or light beams propagating to observing-point images displayed on said display section so as to guide said light beams in the respective angular directions of said light beams.

8. The display apparatus according to claim 1, said display apparatus further having a second display mode wherein:
a single observing-point image is displayed on said display section; and
said light-beam control section operates to control light beams coming from said single observing-point image or light beams leading to said single observing-point image to propagate as they are.

9. The display apparatus according to claim 1 wherein:
said light-beam control section is a barrier section configured to transmit or block light; and
said barrier section has a plurality of fixed opening sections.

10. The display apparatus according to claim 1 wherein said light-beam control section has a plurality of variable-characteristic lenses, the refraction indexes of which can each be switched from one value to another.

11. The display apparatus according to claim 1 wherein said light-beam control section has a plurality of fixed-characteristic lenses.

12. The display apparatus according to claim 1, said display apparatus further comprising:
a backlight; wherein
said display section is a liquid-crystal display section, and said liquid-crystal display section is provided between said backlight and said light-beam control section.

13. The display apparatus according to claim 1, said display apparatus further comprising:
a backlight; wherein
said display section is a liquid-crystal display section, and
said light-beam control section is provided between said backlight and said liquid-crystal display section.

14. An electronic device comprising:
a display apparatus; and
a control section configured to control operations making use of said display apparatus; wherein
said display apparatus includes
a display section, and
a light-beam control section configured to control a light beam coming from said display section or a light beam propagating to said display section,
said display apparatus has a first display mode for displaying a plurality of observing-point images on said display section,
said observing-point images include two or more first observing-point images and one or a plurality of second observing-point images, and
the number of pixels included in each of said second observing-point images is smaller than the number of pixels included in each of said first observing-point images
each of said first observing-point images is displayed by making use of a first pixel group including a plurality of pixels;
each of said second observing-point images is displayed by making use of a second pixel group including pixels;
the number of pixels included in said second pixel group is smaller than the number of pixels included in said first pixel group;
two or more said first pixel groups used for displaying said two or more first observing-point images and one or a plurality of said second pixel groups used for displaying said one or a plurality of second observing-point images form a basic pixel set;
in said basic pixel set, an interpolated pixel group pertaining to said second pixel group is interpolated between said first pixel groups;
each pixel of said interpolated pixel group is a pixel of an observing-point image for an intermediate observing point between observing points for said first observing-point images displayed by said first pixel groups interpolating said interpolated pixel group in said basic pixel set; and
said two or more first observing-point images are left-eye and right-eye images whereas said seconded observing-point images are one or a plurality of interpolation images between said left-eye and right-eye images.

15. The electronic device according to claim 14 wherein:
each of said first observing-point images is displayed by making use of a first pixel group including a plurality of pixels;
each of said second observing-point images is displayed by making use of a second pixel group including pixels;
the number of pixels included in said second pixel group is smaller than the number of pixels included in said first pixel group; and
two or more said first pixel groups used for displaying said two or more first observing-point images and one or a plurality of said second pixel groups used for displaying said one or a plurality of second observing-point images form a basic pixel set.

16. The electronic device according to claim 15 wherein said second pixel group is interpolated between said first pixel groups in said basic pixel set.

* * * * *